(12) United States Patent
Wang

(10) Patent No.: US 12,343,809 B2
(45) Date of Patent: Jul. 1, 2025

(54) RECIPROCATING TOOL HAVING ORBIT FUNCTION

(71) Applicant: Black & Decker Inc., New Britain, CT (US)

(72) Inventor: Yanchao Wang, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 551 days.

(21) Appl. No.: 17/654,130

(22) Filed: Mar. 9, 2022

(65) Prior Publication Data

US 2023/0286126 A1 Sep. 14, 2023

(51) Int. Cl.
*B23D 49/16* (2006.01)
*B23D 51/16* (2006.01)
*B23D 51/20* (2006.01)
*B25F 5/00* (2006.01)

(52) U.S. Cl.
CPC ......... *B23D 49/165* (2013.01); *B23D 49/167* (2013.01); *B23D 51/166* (2013.01); *B23D 51/20* (2013.01); *B25F 5/00* (2013.01)

(58) Field of Classification Search
CPC .... B23D 49/007; B23D 49/008; B23D 49/10; B23D 49/11; B23D 49/162; B23D 49/165; B23D 49/167; B23D 51/025; B23D 51/08; B23D 51/10; B23D 51/16; B23D 51/166; B23D 51/20; B27B 19/00; B27B 19/006; B27B 19/008; B27B 3/26; B27B 11/02; B27B 11/06; B25F 5/00
USPC ...................................................... 30/392–394
See application file for complete search history.

(56) References Cited

U.S. PATENT DOCUMENTS

| 1,362,628 | A | 12/1920 | Lewis |
| 1,525,070 | A | 2/1925 | Coleman |
| 2,240,755 | A | 5/1941 | Martin |
| 2,610,524 | A | 9/1952 | Maust |
| 2,704,941 | A | 3/1955 | Holford |
| 2,931,402 | A | 4/1960 | Papworth |

(Continued)

FOREIGN PATENT DOCUMENTS

| CN | 2853254 Y | 1/2007 |
| CN | 104209586 A | 12/2014 |

(Continued)

OTHER PUBLICATIONS

International Search Report and Written Opinion for PCT Application PCT/US2023/064003, mailed on Aug. 1, 2023, 7 pages.

*Primary Examiner* — Jason Daniel Prone
(74) *Attorney, Agent, or Firm* — Brake Hughes Bellermann LLP

(57) ABSTRACT

A reciprocating power tool may include a driving system including a motor and a transmission received in a housing to drive a reciprocating mechanism. A selection mechanism may provide for selection of an operation mode of the reciprocating tool, including a linear mode of operation and at least one orbital mode of operation. Motion of a reciprocating shaft of the reciprocating mechanism may be guided by a guide bracket that is fixed in the housing and an orbit bushing that is movably coupled in the housing. In the linear mode of operation of the tool, the bushing is in a first position relative to the guide bracket. In an orbital mode of operation of the tool, the bushing is moved to a second position relative to the guide bracket.

19 Claims, 16 Drawing Sheets

(56) References Cited

U.S. PATENT DOCUMENTS

| | | | |
|---|---|---|---|
| 2,949,944 A | 8/1960 | Blachly | |
| 2,966,178 A | 12/1960 | Katzfey | |
| 2,970,484 A | 2/1961 | Springer | |
| 3,095,748 A | 7/1963 | Stelljes et al. | |
| 3,205,721 A | 9/1965 | Speer | |
| 3,206,989 A | 9/1965 | Enders | |
| 3,229,793 A | 1/1966 | Jacobson | |
| 3,246,528 A | 4/1966 | Kosch | |
| 3,270,369 A | 9/1966 | William | |
| 3,309,932 A | 3/1967 | Davis | |
| 3,451,276 A | 6/1969 | Wadlow et al. | |
| 3,457,796 A | 7/1969 | Leach et al. | |
| 3,461,732 A | 8/1969 | Gregory | |
| 3,482,458 A | 12/1969 | Bednarski | |
| 3,655,021 A | 4/1972 | Froio | |
| 3,688,522 A | 9/1972 | Schmuck | |
| 3,729,823 A | 5/1973 | Bos et al. | |
| 3,750,483 A | 8/1973 | Burrows et al. | |
| 3,766,362 A | 10/1973 | Pell et al. | |
| 3,978,862 A | 9/1976 | Morrison | |
| 4,145,811 A | 3/1979 | Kendzior | |
| 4,385,443 A | 5/1983 | Obanion | |
| 4,482,042 A | 11/1984 | Siska et al. | |
| 4,542,812 A | 9/1985 | Westley | |
| 4,550,501 A | 11/1985 | Moores et al. | |
| 4,884,344 A | 12/1989 | Martinez et al. | |
| 5,009,012 A | 4/1991 | Martinez et al. | |
| 5,025,562 A | 6/1991 | Palm | |
| 5,050,307 A | 9/1991 | Palm | |
| 5,099,705 A | 3/1992 | Dravnieks | |
| 5,134,777 A | 8/1992 | Meyer et al. | |
| 5,205,043 A * | 4/1993 | Batt | B23D 49/165 30/393 |
| 5,212,887 A | 5/1993 | Farmerie | |
| 5,392,519 A | 2/1995 | Noue et al. | |
| RE35,258 E | 6/1996 | Palm | |
| 5,561,909 A | 10/1996 | Berg et al. | |
| 5,566,458 A | 10/1996 | Palm | |
| 5,598,636 A | 2/1997 | Stolzer | |
| 5,607,023 A | 3/1997 | Palm | |
| 5,653,030 A | 8/1997 | Yokoyama et al. | |
| 5,689,891 A | 11/1997 | Bednar et al. | |
| 5,806,191 A | 9/1998 | Yokoyama et al. | |
| 5,964,039 A | 10/1999 | Mizoguchi et al. | |
| 6,012,346 A | 1/2000 | Vo | |
| 6,209,208 B1 | 4/2001 | Marinkovich et al. | |
| 6,212,781 B1 | 4/2001 | Marinkovich et al. | |
| RE37,211 E | 6/2001 | Bednar et al. | |
| 6,249,979 B1 | 6/2001 | Bednar et al. | |
| 6,260,281 B1 | 7/2001 | Okumura et al. | |
| 6,282,797 B1 | 9/2001 | Osada et al. | |
| 6,286,217 B1 | 9/2001 | Dassoulas et al. | |
| 6,295,910 B1 | 10/2001 | Childs et al. | |
| RE37,529 E | 1/2002 | Bednar et al. | |
| 6,357,125 B1 | 3/2002 | Feldmann et al. | |
| D455,328 S | 4/2002 | Bruno | |
| 6,370,781 B1 | 4/2002 | Sasaki | |
| 6,508,151 B1 | 1/2003 | Neitzell | |
| 6,634,107 B2 | 10/2003 | Osada | |
| 6,634,437 B1 | 10/2003 | Rudolph | |
| 6,662,455 B2 | 12/2003 | Tachibana et al. | |
| 6,688,005 B1 | 2/2004 | Tachibana et al. | |
| 6,742,267 B2 | 6/2004 | Marinkovich et al. | |
| 6,758,119 B1 | 7/2004 | Neitzell | |
| RE38,606 E | 10/2004 | Bednar et al. | |
| 6,829,831 B1 | 12/2004 | Neitzell | |
| 6,851,193 B2 | 2/2005 | Bednar et al. | |
| 6,860,886 B1 | 3/2005 | Lee | |
| 6,877,235 B2 | 4/2005 | Osada | |
| 6,976,313 B2 | 12/2005 | Wong | |
| 7,127,973 B2 | 10/2006 | Neitzell et al. | |
| 7,188,425 B2 | 3/2007 | Bednar et al. | |
| 7,191,847 B2 | 3/2007 | Haas | |
| 7,216,433 B2 | 5/2007 | Haas et al. | |
| 7,225,546 B2 | 6/2007 | Hartmann | |
| 7,290,343 B2 | 11/2007 | Hartmann | |
| 7,363,713 B2 | 4/2008 | Kobayashi et al. | |
| 7,448,137 B2 | 11/2008 | Neitzell et al. | |
| 7,506,447 B2 | 3/2009 | Wheeler et al. | |
| 7,637,018 B2 | 12/2009 | Zhang | |
| 7,707,729 B2 | 5/2010 | Moreno | |
| 7,793,420 B2 | 9/2010 | Griep et al. | |
| 7,818,887 B2 | 10/2010 | Saegesser et al. | |
| 7,886,841 B2 | 2/2011 | Armstrong | |
| 7,996,996 B2 | 8/2011 | Hirabayashi | |
| 8,201,337 B2 | 6/2012 | Tam et al. | |
| 8,230,608 B2 | 7/2012 | Oberheim | |
| 8,307,910 B2 | 11/2012 | Holmes et al. | |
| D674,263 S | 1/2013 | Aglassinger | |
| 8,371,032 B2 | 2/2013 | Hirabayashi | |
| 8,403,075 B2 | 3/2013 | Schlesak et al. | |
| 8,407,901 B2 | 4/2013 | Oberheim | |
| 8,407,902 B2 | 4/2013 | Naughton et al. | |
| 8,578,615 B2 * | 11/2013 | Baskar | B23D 51/02 30/392 |
| 8,763,722 B2 | 7/2014 | Braun et al. | |
| 8,813,373 B2 | 8/2014 | Scott | |
| 8,905,153 B2 | 12/2014 | Braun et al. | |
| 9,061,411 B2 | 6/2015 | Naughton et al. | |
| 9,132,491 B2 | 9/2015 | Alberti et al. | |
| 9,156,097 B2 | 10/2015 | Neitzell et al. | |
| 9,233,427 B2 | 1/2016 | Alberti et al. | |
| 9,272,347 B2 | 3/2016 | Holmes et al. | |
| 9,393,681 B2 | 7/2016 | Werner | |
| 9,470,273 B2 | 10/2016 | Lang et al. | |
| 9,561,552 B2 | 2/2017 | Kocsis et al. | |
| 9,573,207 B2 | 2/2017 | Sugita et al. | |
| 9,579,735 B2 | 2/2017 | Wattenbach et al. | |
| 9,700,949 B2 * | 7/2017 | Wang | B23D 51/16 |
| 9,724,771 B2 | 8/2017 | Aoki et al. | |
| 9,744,605 B2 * | 8/2017 | Wang | B23D 49/16 |
| 9,776,263 B2 | 10/2017 | Adams et al. | |
| 9,827,623 B2 * | 11/2017 | Gibbons | B23D 51/16 |
| 9,956,625 B2 | 5/2018 | Adams et al. | |
| 10,144,106 B2 | 12/2018 | McLain et al. | |
| 10,259,060 B2 | 4/2019 | Sugino et al. | |
| 10,300,541 B2 | 5/2019 | Adams et al. | |
| 10,464,148 B2 | 11/2019 | Wattenbach et al. | |
| 11,229,963 B2 | 1/2022 | Mougeotte et al. | |
| 11,839,964 B2 * | 12/2023 | Wang | B23D 49/16 |
| 11,958,121 B2 * | 4/2024 | Wang | B23D 51/16 |
| 2003/0121389 A1 | 7/2003 | Wheeler et al. | |
| 2004/0194987 A1 | 10/2004 | Hanke et al. | |
| 2004/0231170 A1 | 11/2004 | Neitzell et al. | |
| 2004/0261273 A1 | 12/2004 | Griep et al. | |
| 2005/0016001 A1 | 1/2005 | Griep et al. | |
| 2005/0252670 A1 | 11/2005 | Prell et al. | |
| 2006/0117581 A1 | 6/2006 | Oki et al. | |
| 2006/0124331 A1 | 6/2006 | Stirm et al. | |
| 2007/0017684 A1 | 1/2007 | Stirm et al. | |
| 2007/0074407 A1 | 4/2007 | Serdynski et al. | |
| 2007/0135803 A1 | 6/2007 | Belson | |
| 2008/0251568 A1 | 10/2008 | Zemlok et al. | |
| 2008/0287944 A1 | 11/2008 | Pearson et al. | |
| 2008/0289843 A1 | 11/2008 | Townsan | |
| 2008/0308602 A1 | 12/2008 | Timm et al. | |
| 2008/0308606 A1 | 12/2008 | Timm et al. | |
| 2008/0308607 A1 | 12/2008 | Timm et al. | |
| 2009/0077818 A1 * | 3/2009 | Van Wambeke | B23D 49/162 30/392 |
| 2010/0162579 A1 | 7/2010 | Naughton et al. | |
| 2010/0320252 A1 | 12/2010 | Viola et al. | |
| 2011/0107608 A1 | 5/2011 | Wattenbach et al. | |
| 2011/0139475 A1 | 6/2011 | Braun et al. | |
| 2011/0315413 A1 | 12/2011 | Fisher et al. | |
| 2012/0096721 A1 | 4/2012 | Sinur | |
| 2012/0192440 A1 | 8/2012 | Jerabek et al. | |
| 2012/0261153 A1 | 10/2012 | Aoki | |
| 2013/0019483 A1 | 1/2013 | Naughton et al. | |
| 2013/0055576 A1 | 3/2013 | Holmes et al. | |
| 2013/0062090 A1 | 3/2013 | Winnard | |
| 2013/0199812 A1 | 8/2013 | Dangelmaier et al. | |
| 2013/0247391 A1 | 9/2013 | Armstrong | |
| 2014/0171966 A1 | 6/2014 | Giordano et al. | |

(56) References Cited

U.S. PATENT DOCUMENTS

| | | | |
|---|---|---|---|
| 2014/0245620 A1 | 9/2014 | Fankhauser et al. | |
| 2014/0299345 A1 | 10/2014 | McRoberts et al. | |
| 2015/0136433 A1 | 5/2015 | Nitsche et al. | |
| 2015/0296719 A1 | 10/2015 | Kuehne et al. | |
| 2016/0151845 A1* | 6/2016 | Yamamoto | B23D 51/16 173/179 |
| 2016/0243634 A1 | 8/2016 | Komazaki | |
| 2017/0129026 A1 | 5/2017 | Wattenbach et al. | |
| 2018/0370012 A1 | 12/2018 | Zheng | |
| 2019/0061081 A1 | 2/2019 | Schaer | |
| 2019/0275597 A1 | 9/2019 | Adams et al. | |
| 2020/0009668 A1 | 1/2020 | Adams et al. | |
| 2020/0030897 A1 | 1/2020 | Wattenbach et al. | |
| 2020/0063827 A1 | 2/2020 | Courtial et al. | |
| 2020/0070265 A1 | 3/2020 | Wang | |
| 2020/0094432 A1 | 3/2020 | Monzen et al. | |
| 2020/0398355 A1 | 12/2020 | Mougeotte et al. | |
| 2021/0170509 A1 | 6/2021 | Cholst et al. | |
| 2021/0213548 A1 | 7/2021 | Castanos et al. | |
| 2022/0305575 A1* | 9/2022 | Ukai | B23D 49/162 |
| 2022/0371112 A1* | 11/2022 | Okamura | B23D 49/162 |
| 2023/0356310 A1* | 11/2023 | Jubeck | B23D 49/16 |
| 2024/0033892 A1* | 2/2024 | Wang | B23D 49/16 |

FOREIGN PATENT DOCUMENTS

| | | |
|---|---|---|
| CN | 104416225 A | 3/2015 |
| DE | 803142 C | 3/1951 |
| DE | 1870185 U | 4/1963 |
| DE | 1673054 A1 | 8/1971 |
| DE | 3446278 A1 | 6/1986 |
| DE | 4009911 A1 | 10/1990 |
| DE | 102007017408 B3 | 8/2008 |
| DE | 102007062869 A1 | 8/2008 |
| DE | 102008042861 A1 | 4/2010 |
| DE | 102011077259 A1 | 12/2012 |
| DE | 102012210678 A1 | 1/2014 |
| DE | 102006041430 B4 | 3/2015 |
| DE | 102017115754 A1 | 1/2018 |
| EP | 0561473 B1 | 1/1998 |
| EP | 1980351 A2 | 10/2008 |
| EP | 2903770 A2 | 8/2015 |
| EP | 2481508 B1 | 6/2016 |
| EP | 3053686 A1 | 8/2016 |
| EP | 2119536 B1 | 8/2017 |
| EP | 3038779 B1 | 3/2020 |
| EP | 3038780 B1 | 4/2020 |
| EP | 3632603 A1 | 4/2020 |
| FR | 2451242 A1 | 10/1980 |
| GB | 891832 A | 3/1962 |
| GB | 2042973 A | 10/1980 |
| GB | 2234034 A | 1/1991 |
| GB | 2252072 A | 7/1992 |
| JP | 2009083332 A | 4/2009 |
| JP | 2009101432 A | 5/2009 |
| JP | 2011115912 A | 6/2011 |
| JP | 2014525354 A | 9/2014 |
| WO | 2006065728 A2 | 6/2006 |
| WO | 2015145912 A1 | 10/2015 |
| WO | 2015155912 A1 | 10/2015 |
| WO | 2019235065 A1 | 12/2019 |

\* cited by examiner

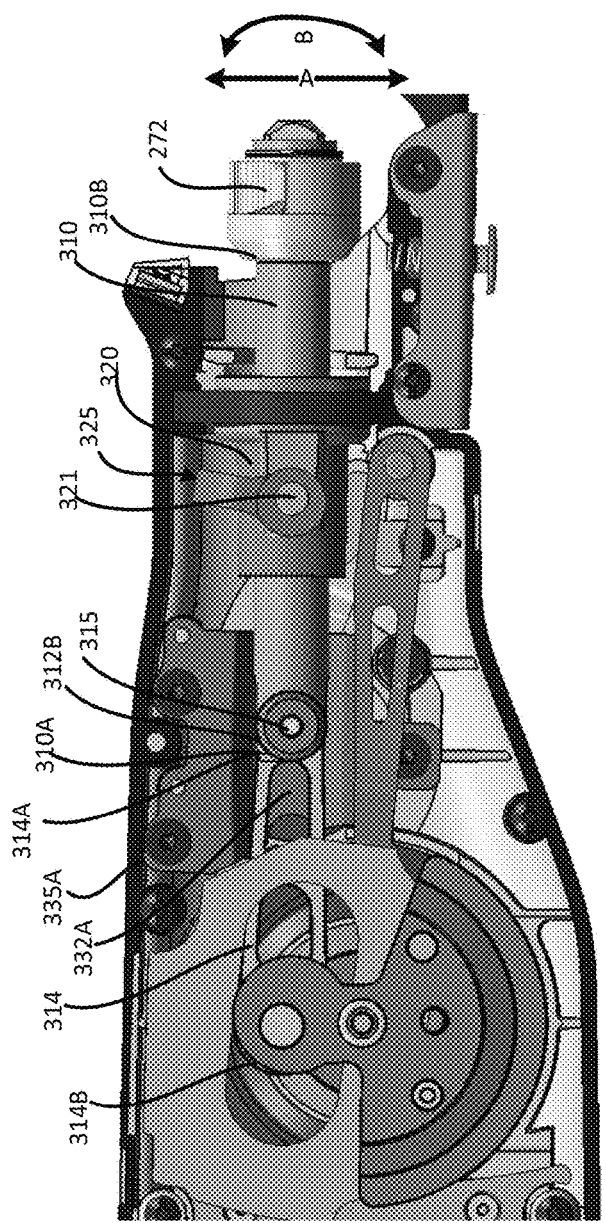
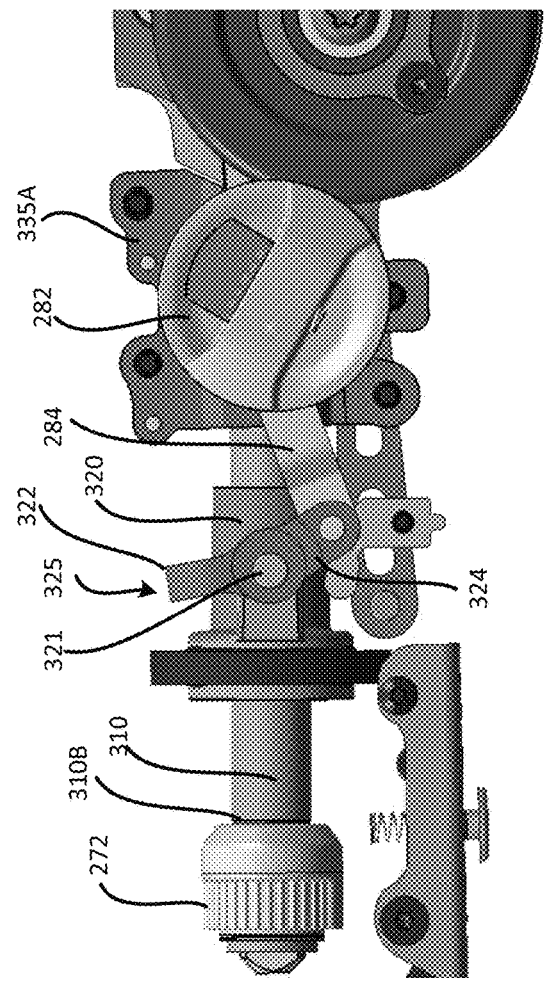
FIG. 3D(1)
FIG. 3D(2)

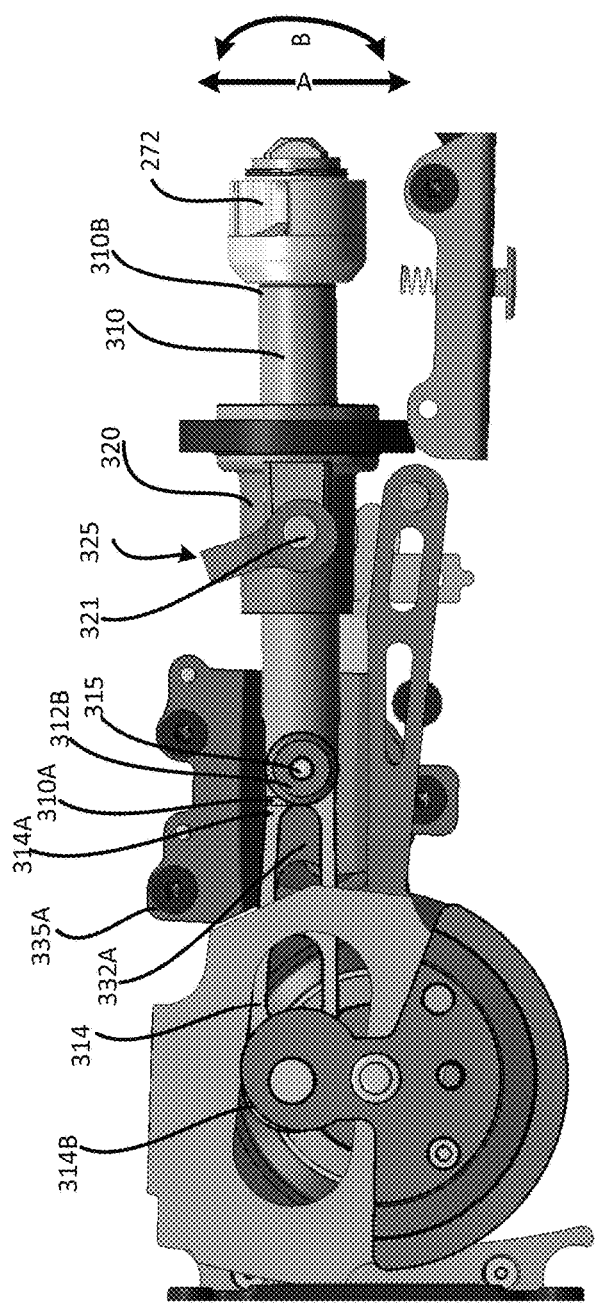
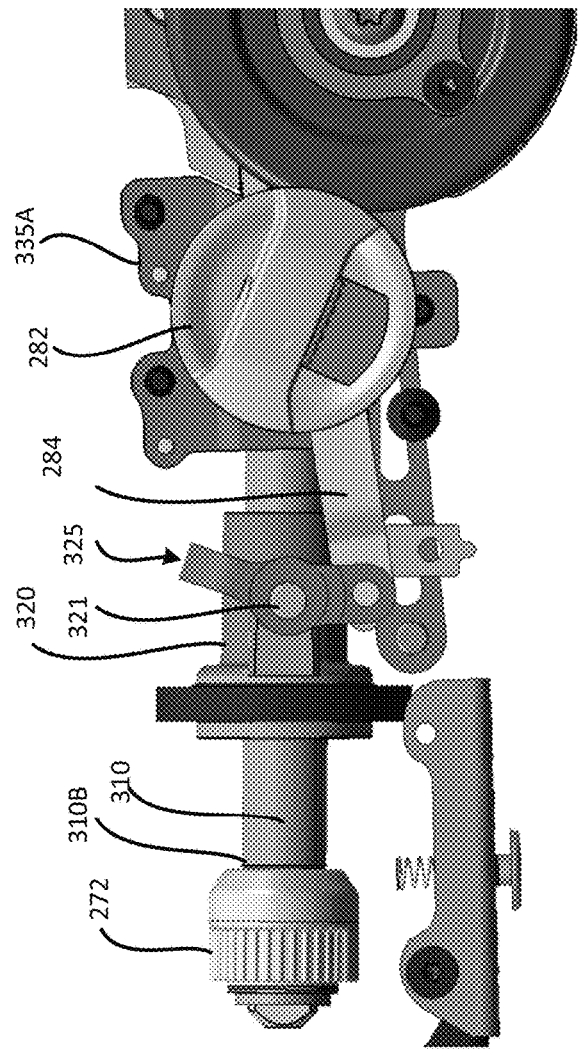
FIG. 3E(1)
FIG. 3E(2)

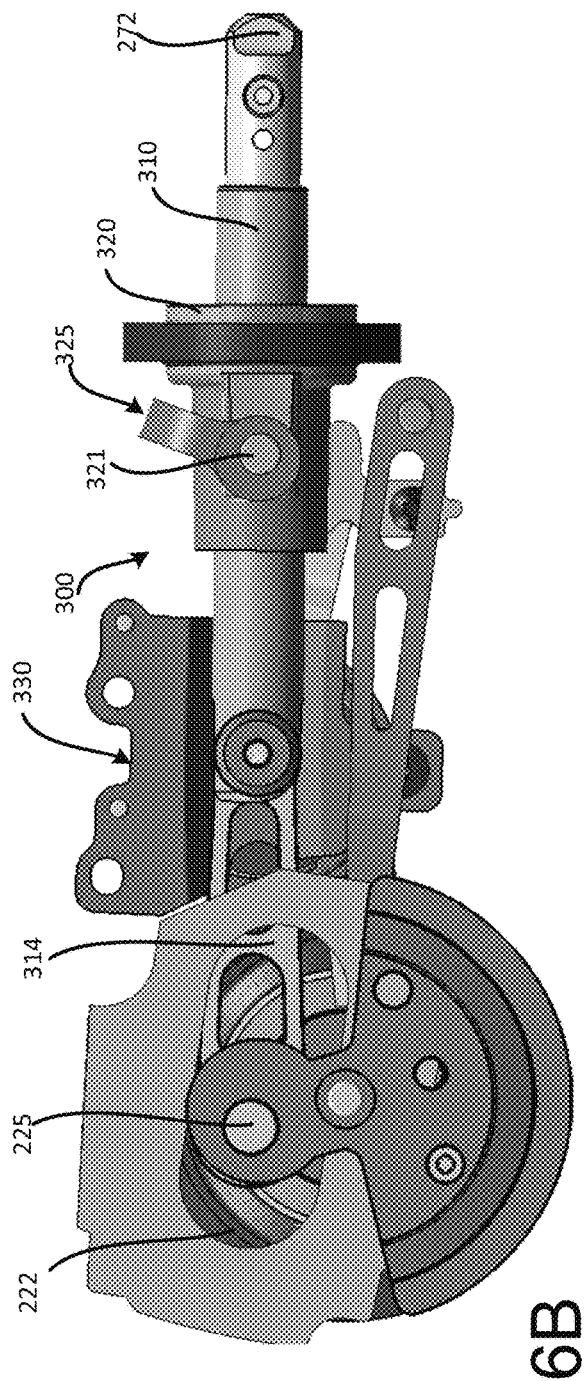
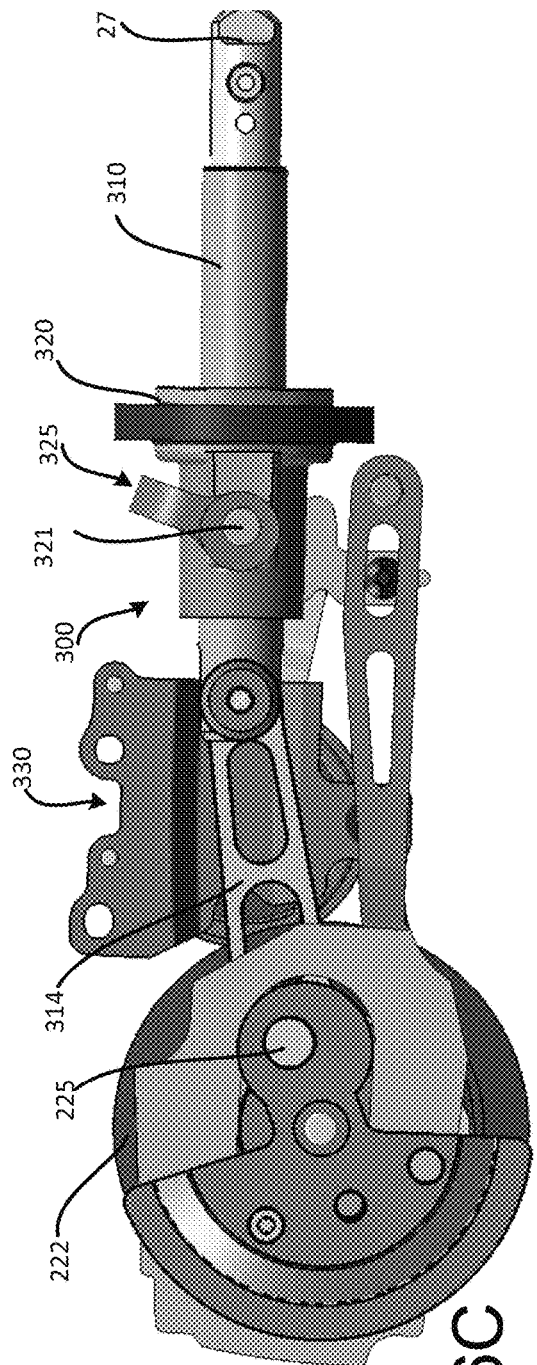
FIG. 6B
FIG. 6C

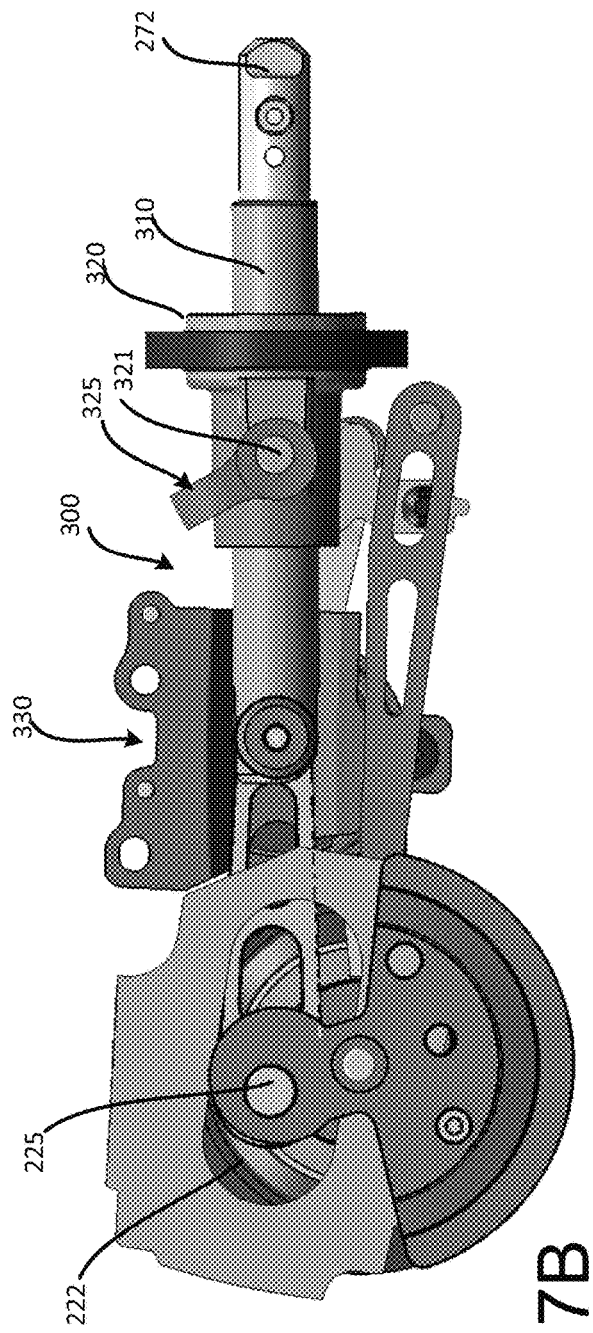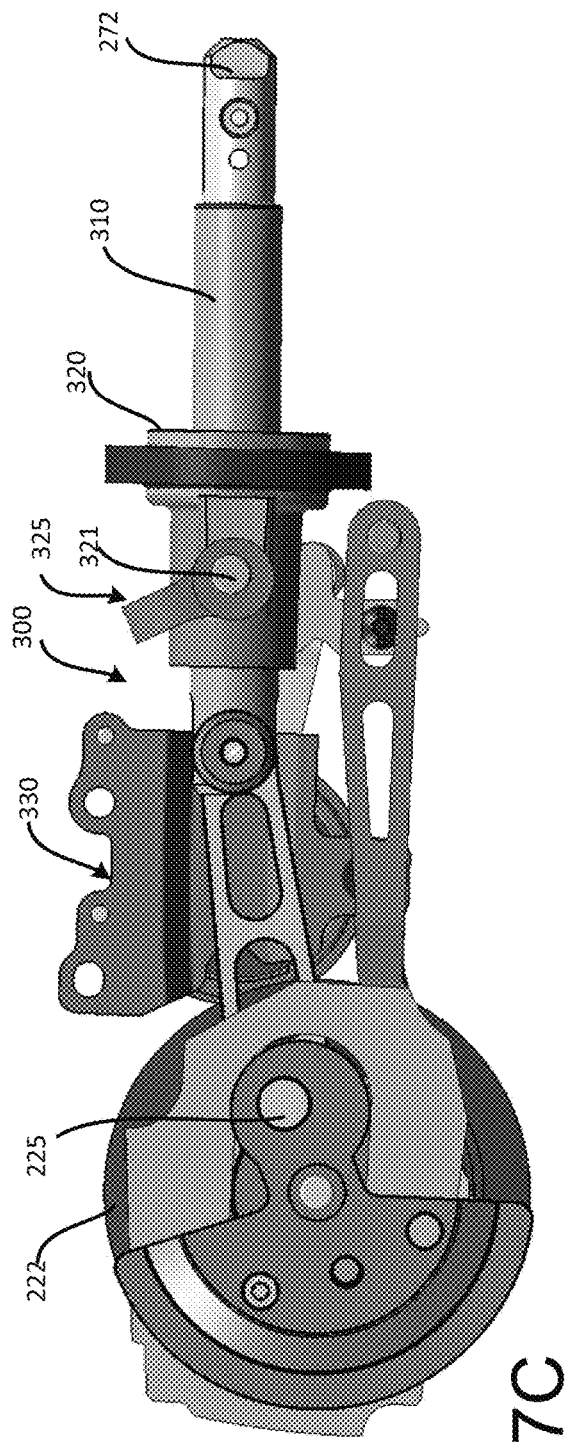
FIG. 7B
FIG. 7C

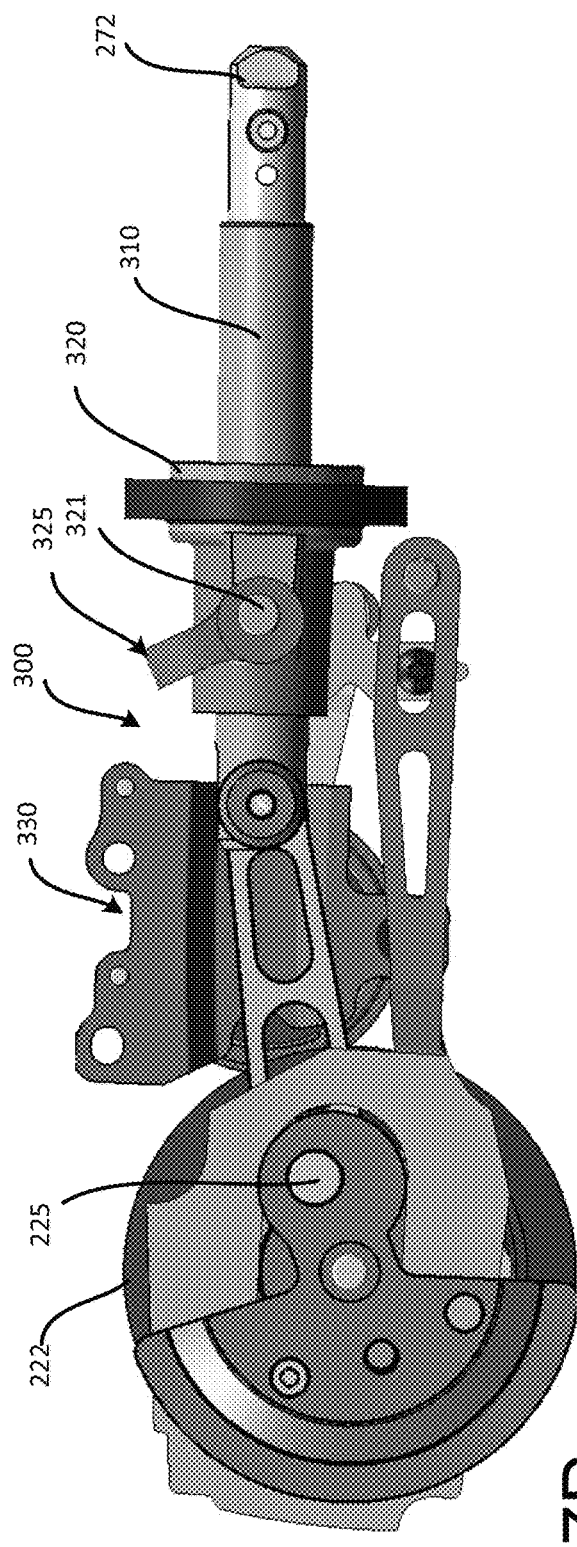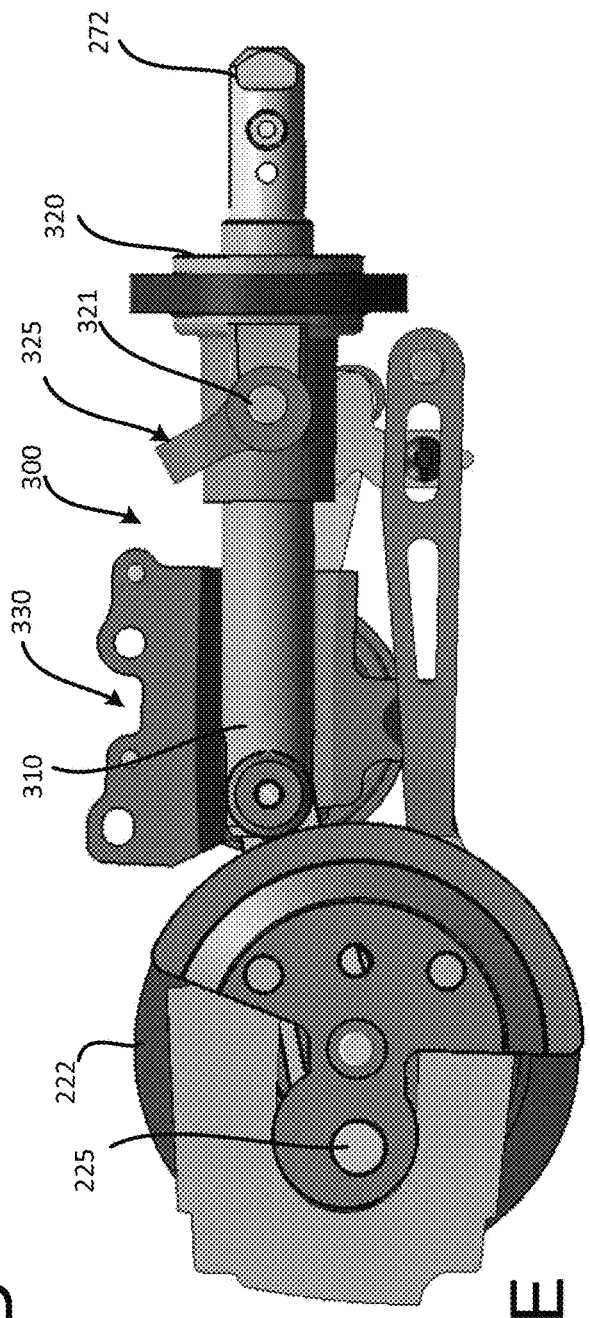
FIG. 7D
FIG. 7E

RECIPROCATING TOOL HAVING ORBIT FUNCTION

FIELD

This document relates, generally, to a reciprocating mechanism for a power tool, and in particular to a reciprocating mechanism having an orbital mode of operation and a linear mode of operation.

BACKGROUND

Reciprocating mechanisms may be included in various different types of tools such as, for example, reciprocating saws and jig saws. In these types of tools, reciprocating mechanisms may convert a rotary force or motion to a reciprocating force or motion, for output by the tool. In some examples, the reciprocating force or motion may be a substantially linear reciprocating force or motion. In some examples, the reciprocating force or motion may follow an orbital path. Operation of a motor of this type of power tool may generate a force, for example, a rotational force. The reciprocating mechanism may be coupled to the motor by, for example, a transmission mechanism that provides for force transfer between the motor and the reciprocating mechanism. The reciprocating mechanism may convert the rotational force, or rotational motion, output by the motor to a reciprocating force or reciprocating motion, to drive a reciprocal motion of an output spindle of the tool. In some examples, interaction of various components of the reciprocating mechanism may cause wear, for example, premature wear of the components, particularly due to operation in the orbital mode of operation. This may result in durability and/or reliability issues, and/or may reduce the life of the tool. Reducing and/or substantially eliminating these types of wear issues may improve the user experience with the tool.

SUMMARY

In one general aspect, a reciprocating power tool may include a housing; a driving system including a motor and a transmission received in the housing; a selection mechanism configured to provide for selection of an operation mode of a plurality of operating modes of the reciprocating tool; and a reciprocating mechanism received in the housing. The reciprocating mechanism may include a guide bracket fixed in the housing; a bushing movably coupled in the housing; and a reciprocating shaft having a first end portion thereof movably coupled to the guide bracket and an intermediate portion thereof movably coupled in the bushing, wherein the reciprocating shaft is configured to reciprocate in response to a force transmitted thereto from the driving system.

In some implementations, a position of the bushing relative to the guide bracket is configured to change based on a position of the selection mechanism corresponding to a selected mode of operation of the reciprocating tool.

In some implementations, the plurality of operation modes of the reciprocating tool may include at least a linear mode of operation in which a reciprocating motion of the reciprocating shaft follows a linear path; and at least one orbital mode of operation in which the reciprocating motion of the reciprocating shaft follows an orbital path.

In some implementations, the guide bracket may include a first guide slot formed in a first side portion of the guide bracket and configured to guide movement of a first roller rotatably coupled to the first end portion of the reciprocating shaft; and a second guide slot formed in a second side portion of the guide bracket, corresponding to the first guide slot formed in the first side portion of the guide bracket, wherein the second guide slot is configured to guide movement of a second roller rotatably coupled to the first end portion of the reciprocating shaft. In a first mode of operation of the reciprocating tool, a centerline of the first and second guide slots may be aligned with a centerline of the bushing; and in a second mode of operation of the reciprocating tool, the centerline of the bushing may be offset from the centerline of the first and second guide slots. The first mode of operation may be a linear mode of operation in which a reciprocating motion of the reciprocating shaft follows a linear path. The second mode of operation may be an orbital mode of operation in which the reciprocating motion of the reciprocating shaft follows an orbital path.

In some implementations, the reciprocating power tool includes a yoke having a first end portion thereof coupled to the first end portion of the reciprocating shaft, and a second end portion thereof coupled to an output gear of the driving system. The second end portion of the yoke may be coupled to an eccentric pin on the output gear of the driving system such that the yoke moves in a linear reciprocal motion in response to rotation of the output gear. The reciprocating shaft may move in a reciprocal motion in response to the reciprocal motion of the yoke. In a first mode of operation in which the bushing is in a first position relative to the guide bracket, motion of the reciprocating shaft may follow a linear reciprocating path in response to the reciprocal motion of the yoke. In a second mode of operation in which the bushing is in a second position relative to the guide bracket, motion of the reciprocating shaft may follow an orbital reciprocating path in response to the reciprocal motion of the yoke.

In some implementations, the reciprocating power tool may include an orbit bracket that movably couples the selection mechanism to the bushing. The orbit bracket may include a first arm having a first end portion coupled to the bushing; and a second arm having a first end portion coupled to a second end portion of the first arm, and a second end portion coupled to a selection arm of the selection mechanism. A position of the bushing relative to the guide bracket may be configured to change in response to a manipulation of a selection knob coupled to the selection arm.

In some implementations, the reciprocating power tool may include an accessory tool holder at a second end portion of the reciprocating shaft.

In another general aspect, a reciprocating power tool may include a housing; a driving system including a motor and a transmission received in the housing; a selection mechanism providing for selection of one of a plurality of modes of operation of the power reciprocating tool; and a reciprocating mechanism coupled to the driving system and to the selection mechanism. The selection mechanism may include a selection knob accessible from an exterior of the housing; and a selection arm coupled to the selection knob at an interior of the housing. The reciprocating mechanism may include a reciprocating shaft; a guide bracket fixed in the housing and configured to guide movement of a first end portion of the reciprocating shaft; a bushing movably coupled in the housing, and coupled to an intermediate portion of the reciprocating shaft, wherein a position of the bushing relative to the fixed guide bracket is changed in response to a manipulation of the selection mechanism; and a yoke having a first end portion thereof coupled to the first end portion of the reciprocating mechanism and a second end portion thereof coupled to an eccentric pin on an output gear of the drive system, wherein the reciprocating shaft is configured to reciprocate in response to rotation of the output gear and a corresponding linear force transmitted thereto by the yoke.

In some implementations, the plurality of operation modes of the reciprocating tool may include at least a linear mode of operation in which a reciprocating motion of the reciprocating shaft follows a linear path; and at least one orbital mode of operation in which the reciprocating motion of the reciprocating shaft follows corresponding orbital path. The at least one orbital mode of operation may include a first orbital mode of operation in which the reciprocal motion of the reciprocating shaft follows a first orbital path; a second orbital mode of operation in which the reciprocal motion of the reciprocating shaft follows a second orbital path having a greater degree of ellipticity than that of the first orbital path; and a third orbital mode of operation in which the reciprocal motion of the reciprocating shaft follows a third orbital path. In some implementations, in the first orbital mode of operation and the second orbital mode of operation, an out stroke of the reciprocating shaft is shifted upward from the linear mode of operation, and a return stroke of the reciprocating shaft is shifted downward from the linear mode of operation. In some implementations, the third orbital mode of operation is an upside-down orbital mode in which the out stroke of the reciprocating shaft is shifted downward from the linear mode of operation, and the return stroke of the reciprocating shaft is shifted upward from the linear mode of operation. In the linear mode of operation of the reciprocating tool, a centerline of the first and second guide slots may be aligned with a centerline of the bushing. In the at least one orbital mode of operation of the reciprocating tool, the centerline of the bushing may be offset from the centerline of the first and second guide slots.

In some implementations, the guide bracket may include a first guide slot formed in a first side portion of the guide bracket and configured to guide movement of a first roller rotatably coupled to the first end portion of the reciprocating shaft; and a second guide slot formed in a second side portion of the guide bracket, corresponding to the first guide slot formed in the first side portion of the guide bracket, wherein the second guide slot is configured to guide movement of a second roller rotatably coupled to the first end portion of the reciprocating shaft.

In some implementations, the reciprocating power tool may include an orbit bracket that movably couples the selection mechanism to the bushing. The orbit bracket may include a first portion coupled to the bushing at a coupling pin; and a second portion coupled to a selection arm of the selection mechanism. The position of the bushing relative to the guide bracket may be configured to change in response to movement of the selection knob coupled to the selection arm, and corresponding movement of the bushing.

The details of one or more implementations are set forth in the accompanying drawings and the description below. Other features will be apparent from the description and drawings, and from the claims.

BRIEF DESCRIPTION OF THE DRAWINGS

FIG. 3D(1) is a first side view, and FIG. 3D(2) is a second side view of the example reciprocating mechanism in a linear mode of operation.

FIG. 3E(1) is a first side view, and FIG. 3E(2) is a second side view of the example reciprocating mechanism in an orbital mode of operation.

FIGS. 6A-6E illustrate operation of the example reciprocating mechanism in a linear mode of operation.

FIGS. 7A-7E illustrate operation of the example reciprocating mechanism in a first orbital mode of operation.

DETAILED DESCRIPTION

Figure 1:
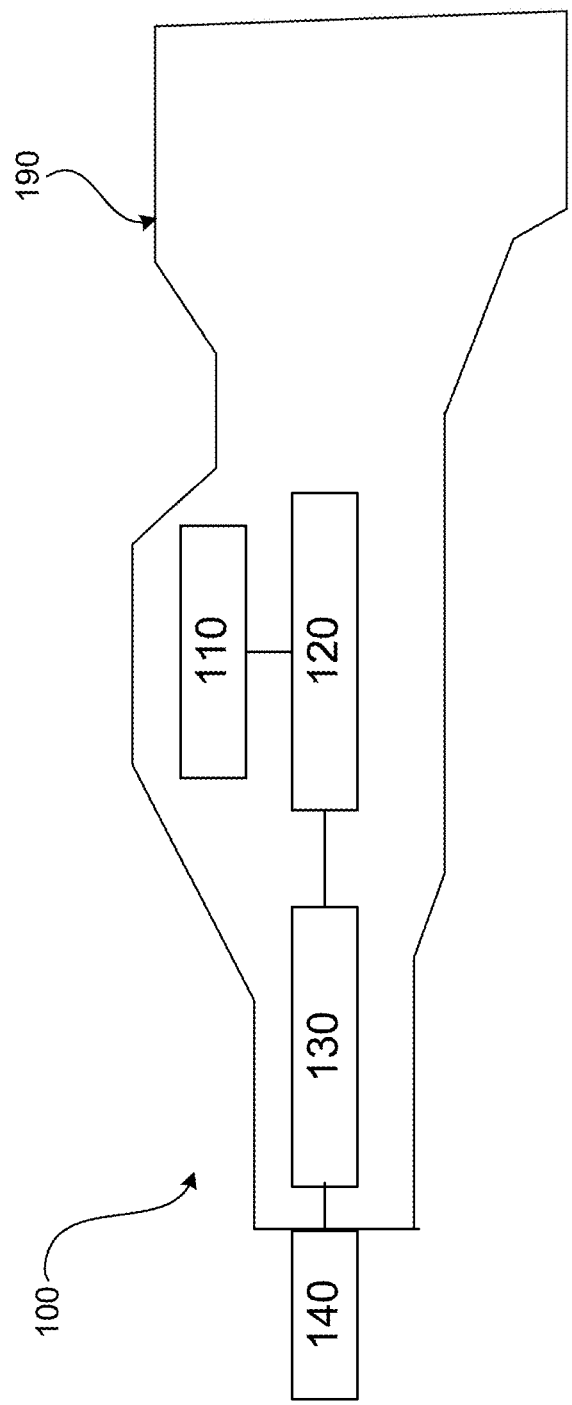
FIG. 1 is a schematic view of an example reciprocating power tool.

A schematic view of an example power tool 100 including a reciprocating mechanism is shown in FIG. 1. The example tool 100 includes a driving system including driving mechanism 110 generating a driving force, for example, a rotational driving force and a transmission mechanism 120 is coupled between the driving mechanism 110 and a reciprocating mechanism 130. The transmission mechanism 120 transfers the driving force generated by the driving mechanism 110 to the reciprocating mechanism 130. In an arrangement in which the driving force generated by the driving mechanism 110 is a rotational force, or a rotational motion, the rotational motion produced by the driving mechanism 110 may be converted into a reciprocating force, or reciprocating motion to be output by an output accessory 140 such as, for example, a blade coupled to the reciprocating mechanism 130. The tool 100 may be operable in a linear mode of operation, in which the reciprocating motion is a linear reciprocating motion. The tool 100 may be operable in an orbital mode of operation, in which the reciprocating motion is an orbital reciprocating motion. The driving mechanism 110, the transmission mechanism 120, and the reciprocating mechanism 130 may be received in and/or coupled to a housing 190. The output accessory 140 coupled to the reciprocating mechanism 130 may extend from the housing 190, to interact with a workpiece (not shown in FIG. 1). In some implementations, the driving mechanism 110 may be an electric motor that receives power from, for example, a power storage device (such as, for example, a battery), an external electrical power source, and the like. In some implementations, the driving mechanism 110 may be an air driven, or pneumatic motor, that is powered by compressed air introduced into the housing 190 from an external compressed air source. Other types of driving mechanisms, and other sources of power, may provide for power driven operation of the tool 100.

In a power tool that makes use of reciprocal motion, an orbital reciprocating motion of the output accessory may improve performance of the tool. For example, orbital reciprocating motion of the output accessory may provide for faster, more efficient cutting through material, may facilitate chip removal from the cutting path of the output accessory. This may render the tool more useful in certain applications, may reduce operation time to complete a particular task, and may reduce user fatigue during operation.

In a reciprocating power tool, premature wear in one or more of the reciprocating components may be generated due to, for example, pivoting and/or orbiting motion and/or interaction of components while also providing for the reciprocating motion during operation of the tool in the orbital mode of operation. This wear may reduce tool life, tool reliability, cutting effectiveness of the tool, and the like. A reciprocating mechanism for a power tool, in accordance with implementations described herein, reduces or substantially eliminates sources of this type of premature wear affecting tool life and/or reliability.

Figure 2:
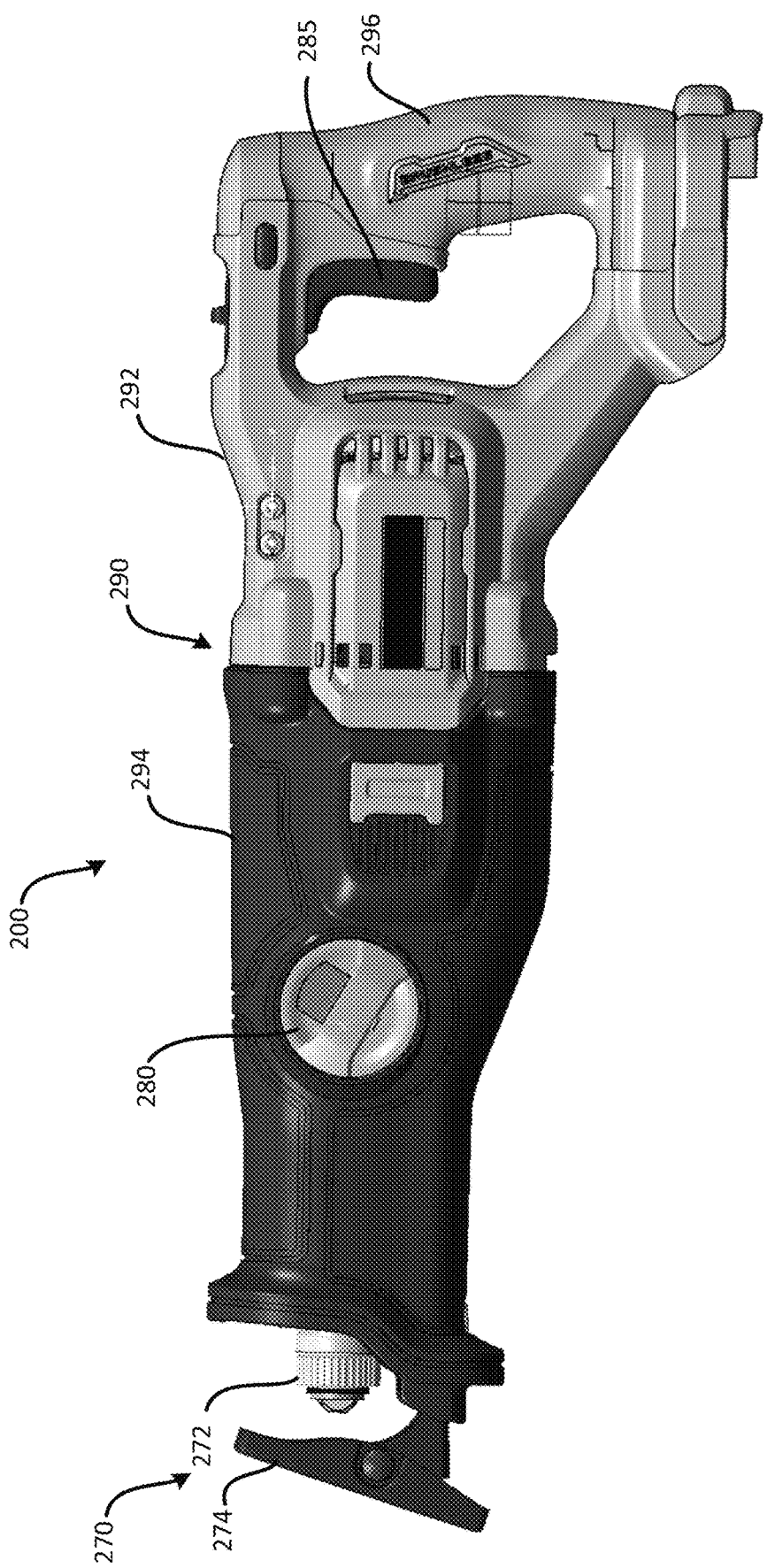
FIG. 2 is a side view of an example reciprocating power tool.

FIG. 2 is a side view of an example reciprocating power tool 200. The example power tool 200 shown in FIG. 2 is a reciprocating saw, simply for purposes of discussion and illustration. The principles to be described herein may be applied to other types of power tools that implement reciprocating motion, and in particular to other types of power tools having a mode of operation that implements an orbital reciprocating motion (such as, for example, jig saws, scroll saws, oscillating tools, and the like).

The example tool 200 may include a housing 290 in which components of the tool 200 are received. In the example shown in FIG. 2, the housing 290 includes a motor housing 292 in which components of a driving system, such as a motor, are received, and an output housing 294 in which output components of the tool 200 are received. One or more selection mechanisms 280 provide for selection of an operating mode of the tool 200. In the example shown in FIG. 2, the tool 200 includes a selection mechanism 280 provided on the output housing 294 that provides for selection of an operation mode, of a plurality of operation modes, of the tool 200 in, for example a linear mode of operation or an orbital mode of operation. An accessory tool coupling device 270 provides for coupling of an accessory tool such as, for example, a blade (not shown in FIG. 2) to the example tool 200. In the example shown in FIG. 2, the accessory tool coupling device 270 includes a tool holder 272 (sometimes referred to as a clamp), provided at a distal end portion of a reciprocating shaft of a reciprocating mechanism housed in the output housing 294. A cleat 274 may be selectively coupled to the output housing 294 and arranged proximate the tool holder 272 to guide a position of the tool 200 relative to a workpiece and maintain alignment of an accessory tool coupled in the tool holder 272 relative to the workpiece. A trigger 285 provided on a handle portion 296 of the housing 290 may be selectively manipulated by the user for operation of the tool 200.

Figure 3A:
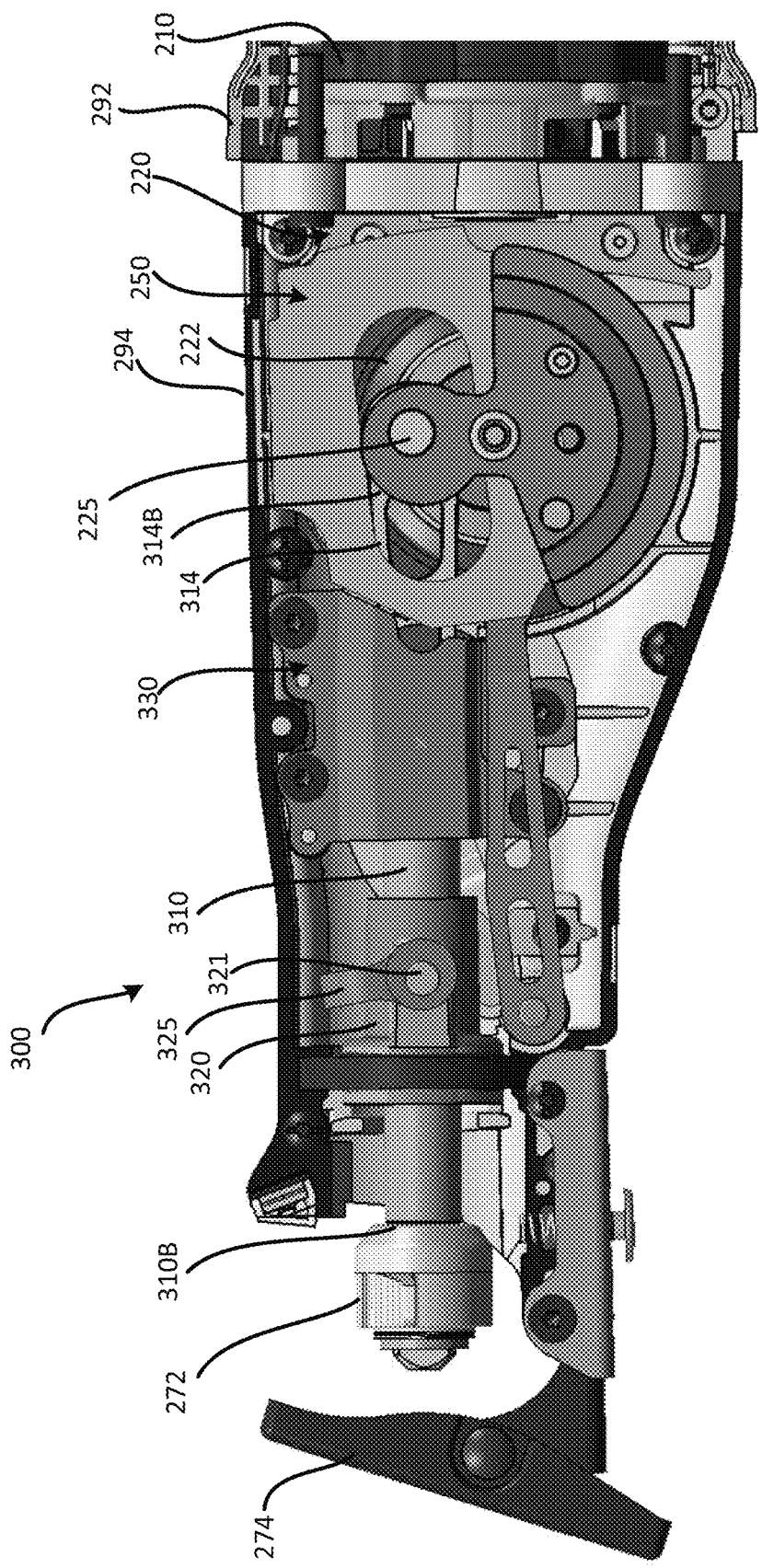
FIG. 3A is a side view of an example reciprocating mechanism, in accordance with implementations described herein.
Figure 3B:
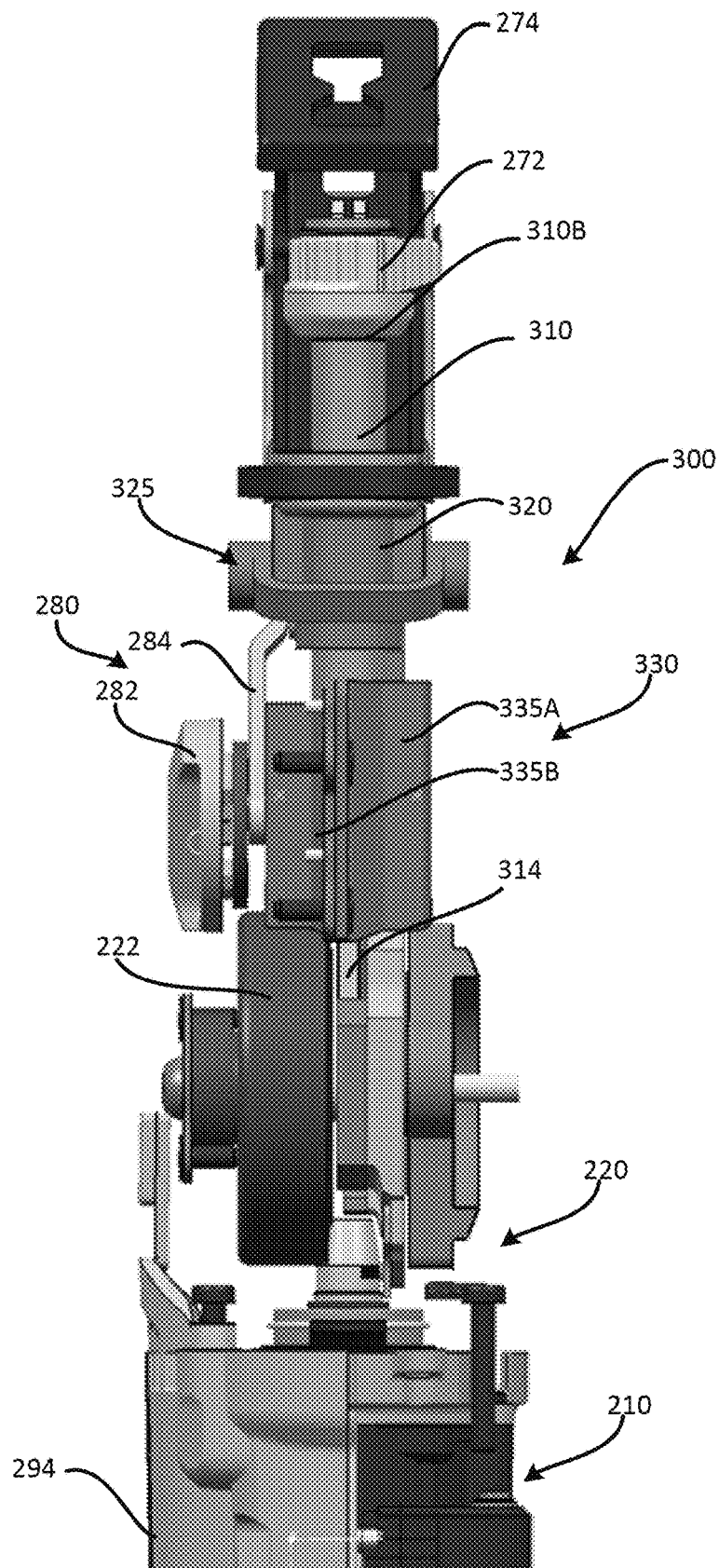
FIG. 3B is a top view of the example reciprocating mechanism shown in FIG. 3A.
Figure 3C:
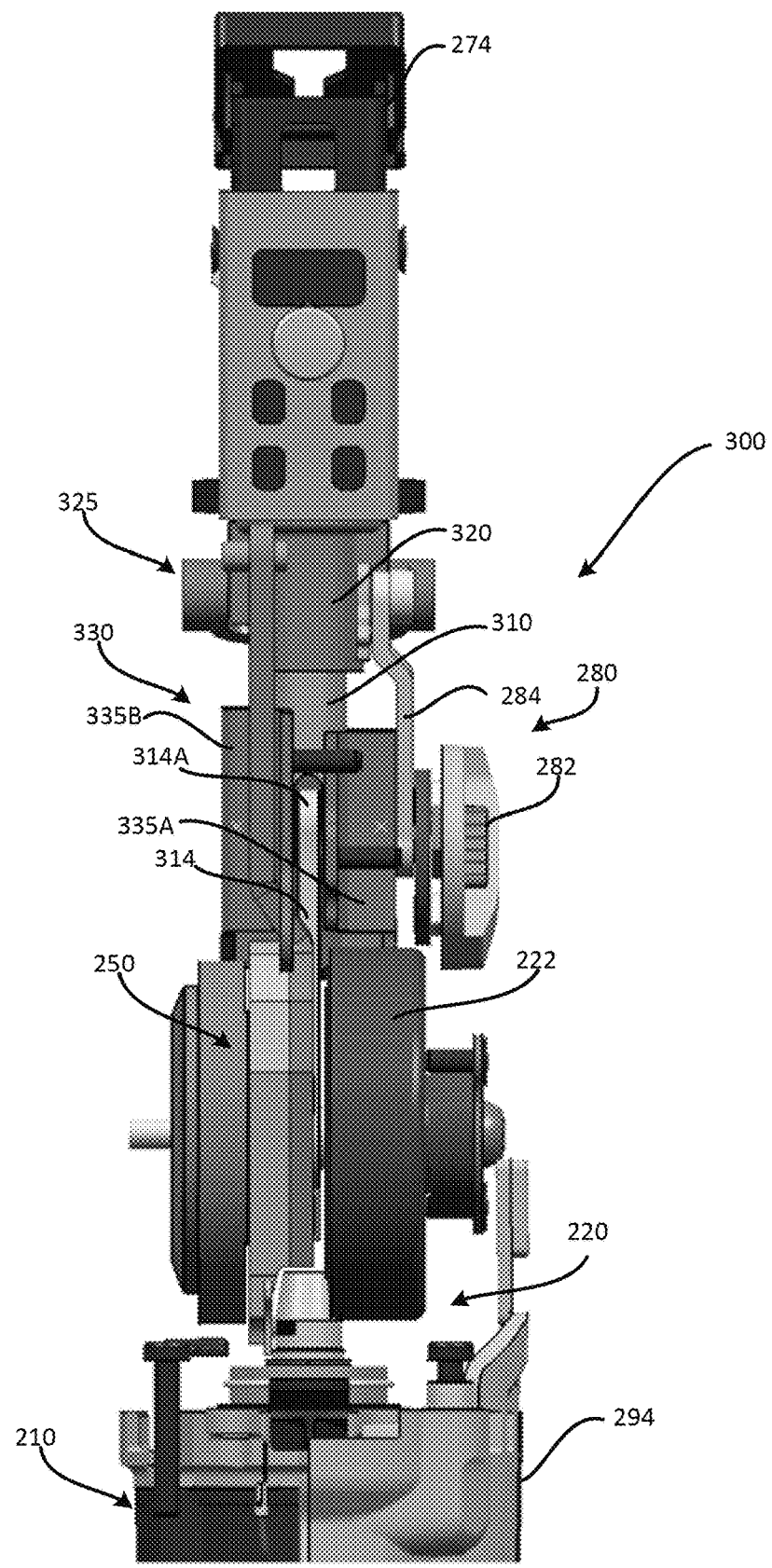
FIG. 3C is a bottom view of the example reciprocating mechanism shown in FIG. 3A.
Figure 3F:
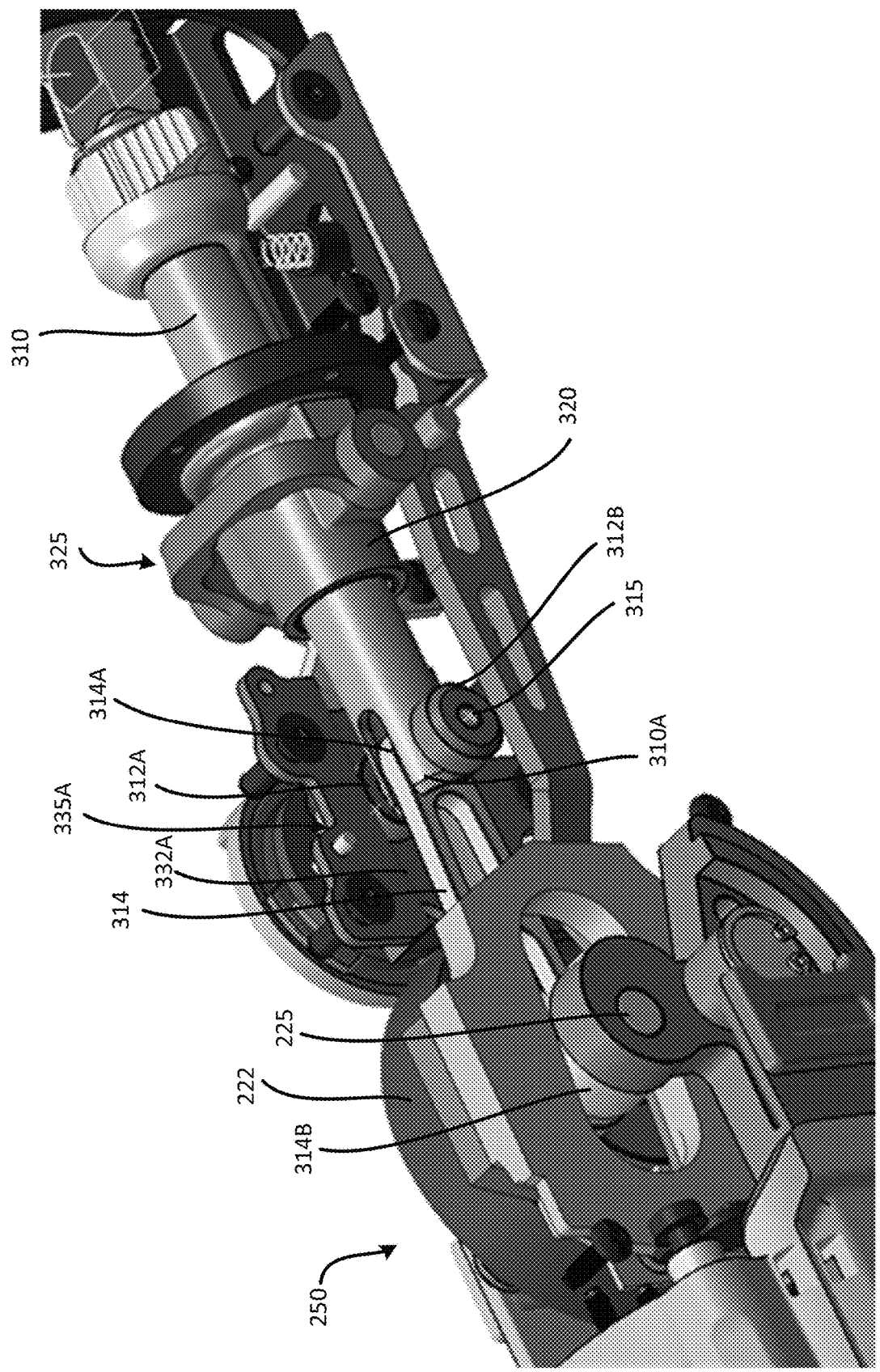
FIG. 3F is a perspective view of the example reciprocating mechanism shown in FIG. 3A.

FIG. 3A is a side view of the example tool 200 shown in FIG. 2, with a portion of the housing 290 removed so that internal components of the tool 200 are visible. FIG. 3B is a top view, and FIG. 3C is a bottom view of the example tool 200 shown in FIG. 2, with the housing 290 removed so that components of an example reciprocating mechanism 300 of the example tool 200 are visible. FIGS. 3D(1) and 3D(2) include first and second side views of the example reciprocating mechanism 300 in a linear mode of operation, and FIGS. 3E(1) and 3E(2) include first and second side views of the example reciprocating mechanism 300 in an orbital mode of operation. FIG. 3F is a perspective view of the example tool 200 shown in FIG. 2, with the housing 290 and portions of an example guide bracket 330 removed so that remaining components of the example reciprocating mechanism 300 of the example tool 200 are visible.

As shown in FIGS. 3A-3F, a driving mechanism including, for example, a motor 210 and a transmission mechanism 220, and a reciprocating mechanism 300 may be received in the housing 290 of the tool 200. The transmission mechanism 220 may convert a driving force, for example, a rotational force, generated by the driving mechanism 210, to a reciprocating linear force to be output by the reciprocating mechanism 300. In some implementations, a counterweighting mechanism 250 may be coupled to the reciprocating mechanism 300 to counteract imbalances generated by the driving and reciprocating mechanisms 210, 300 during operation of the tool 200.

The example reciprocating mechanism 300 shown in FIGS. 3A-3F includes a reciprocating shaft 310 having a first end portion thereof coupled to and cooperating with a guide bracket 330. The guide bracket 330 is, in turn, coupled to the output housing 294. The tool holder 272 is coupled to a second end portion of the reciprocating shaft 310. An intermediate portion of the reciprocating shaft 310 is slidably received in an orbit bushing 320. A yoke 314 has a first end portion coupled to the first end portion of the reciprocating shaft 310, and a second end portion coupled to an output gear 222 of the transmission mechanism 220, the output gear 222 of the transmission mechanism 220 being coupled to and driven by and output shaft/output gear of the motor 210 (not explicitly shown in FIGS. 3A-3F). For example, the second end portion of the yoke 314 may be coupled to a pin 225 of the output gear 222. The pin 225 may be eccentrically positioned relative to a center of rotation of the output gear. Rotation of the output gear 222 causes reciprocal motion of the second end portion of the yoke 314 coupled to the pin 225, in turn causing reciprocal motion of the reciprocating shaft 310 coupled to the first end portion of the yoke 314.

The guide bracket 330 may be coupled, for example, fixedly coupled to a portion of the tool 200, such as the housing 290, so that the guide bracket 330 is fixed, and remains stationary within the housing 290. The guide bracket 330 includes a first bracket 335A and a second bracket 335B coupled to the first bracket 335A. The first end portion of the reciprocating shaft 310 is received in a space formed between the first and second brackets 335A, 335B. In the views shown in FIGS. 3D-3F, the second bracket 335B is removed, so that interaction between the first end portion of the reciprocating shaft 310 and the interior facing side of the guide bracket 330 is visible.

As shown in FIGS. 3D-3F, a first roller 312A and a second roller 312B are mounted on a shaft 315 extending through the first end portion of the reciprocating shaft 310. The first roller 312A is positioned on a first side of the first end portion of the reciprocating shaft 310, and is movably received in a first guide slot 332A formed in the first bracket 335A of the guide bracket 330. The second roller 312B is positioned on a second side of the first end portion of the reciprocating shaft 310, and is movably received in a second guide slot formed in the second bracket 335B of the guide bracket 330. The second guide slot is not shown in FIGS. 3D-3F. In some examples, the configuration of the second bracket 335B and placement of the second guide slot in the second bracket 335B, may mirror that of the first bracket 335A. Interaction of the first roller 312A in the first guide slot 332A of the first bracket 335A and the second roller 312B in the second guide slot of the second bracket 335B guides the reciprocating motion of the reciprocating shaft 310. The principles to be described herein may be similarly applied to the interaction of the first roller 312A in the first guide slot 332A of the first bracket 335A of the guide bracket 330, and to the interaction of the second roller 312B in the second guide slot of the second bracket 335B of the guide bracket 330.

In the example arrangement shown in FIGS. 3A-3F, the guide bracket 330 remains fixed relative to the housing 290, and the orbit bushing 320 is movable (for example, vertically movable in the example orientation of the tool 200 shown in FIGS. 3A, 3D and 3E), based on a mode of operation of the tool 200 selected through manipulation of the selection mechanism 280 and corresponding movement of the orbit bracket 325 and orbit bushing 320. FIGS. 3D(1) is a first side view and FIG. 3D(2) is a second side view of a position and/or orientation of the components of the reciprocating mechanism 300 in a linear mode of operation of the example tool 200. FIGS. 3E(1) is a first side view and FIG. 3E(2) is a second side view of a position and/or orientation of the components of the reciprocating mechanism 300 in an orbital mode of operation of the example tool 200. That is, a position of the orbit bushing 320 may change in response to manipulation of the selection mechanism 280 and movement of the pin 321 (for example, in the direction of the arrow A), causing a corresponding change in orientation of orbit bushing 320 and the reciprocating shaft 310 slidably received therein (for example, as the bushing 320 rotates about the pin 320321 in the direction of the arrow B). That is, the selection knob 282 may be rotated to select a particular mode of operation, causing the arm 284 coupled thereto to move in a corresponding direction. The movement of the selection arm 284, which is also coupled to the orbit bracket 325 at a coupling pin 321, in turn causes corresponding movement of the orbit bushing 320 and a corresponding change in orientation of the shaft 310 slidably received therein. Thus, in this example arrangement, the orbit bracket 325 provides for the coupling of the selection mechanism 280 to the orbit bushing 320. The orbit bracket 325 includes a first arm 322 having a first end portion coupled to the orbit bushing 320 and a second arm 324 having a first end portion coupled to a second end portion of the first arm 322, and a second end portion coupled to the selection arm 284 of the selection mechanism 280. The selection knob 282 is coupled to the arm 284, with the arm 284 in turn coupled to the orbit bracket 325 via the coupling pin 321. When coupled in this manner, a position of the orbit bracket 325 may be moved in response to manipulation of the selection mechanism 280, for example movement of the selection knob 282, causing a corresponding change in position of the orbit bushing 320 and a corresponding change in orientation of the reciprocating shaft 310.

Figure 4A:
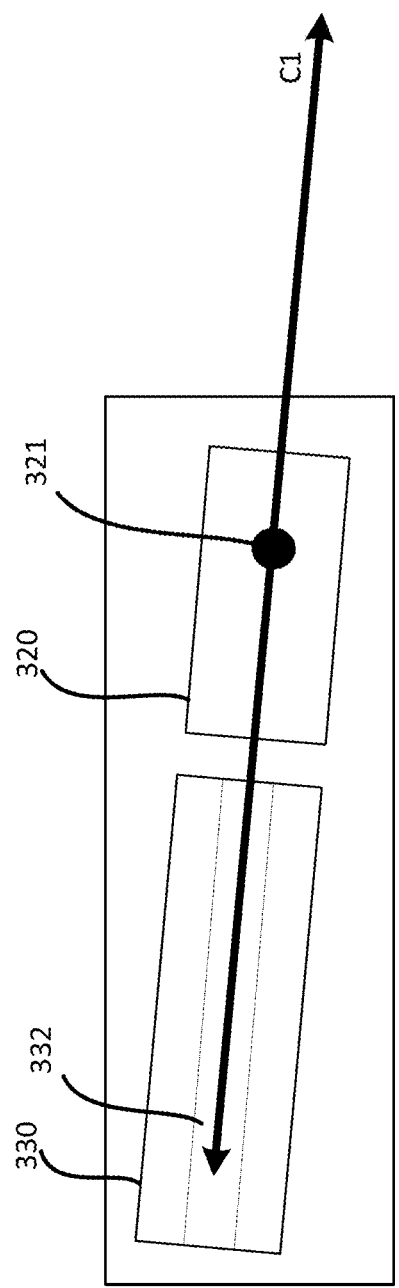
FIG. 4A is a schematic illustration of operation of the example reciprocating mechanism in a linear mode of operation.
Figure 4B:
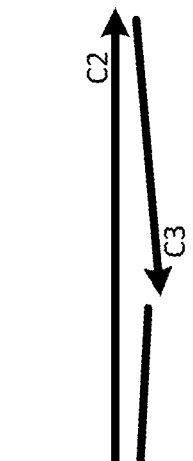
FIG. 4B is a schematic illustration of operation of the example reciprocating mechanism in an orbital mode of operation.
Figure 4B:
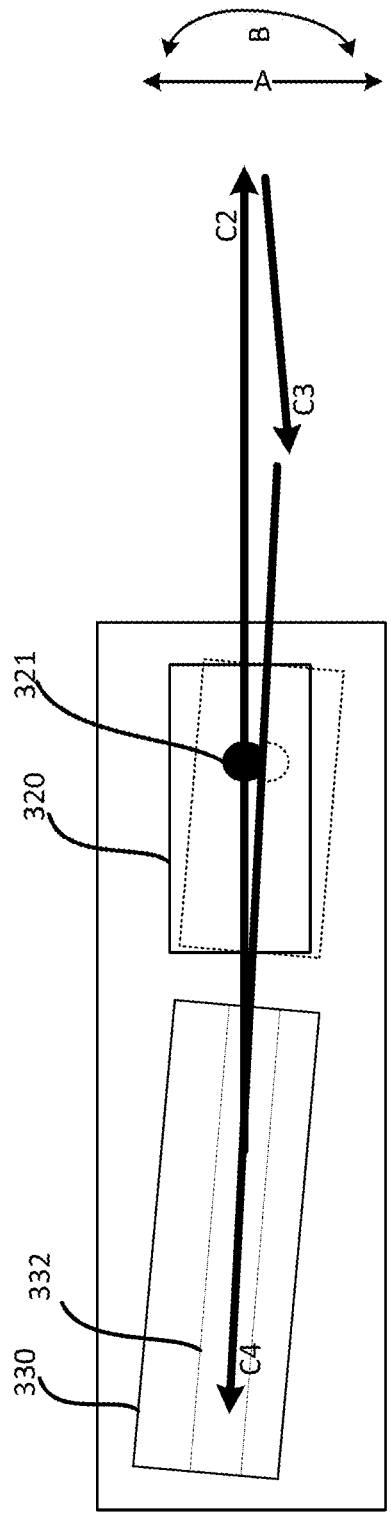

FIG. 4A is a schematic illustration of the relative arrangement of the guide bracket 330 and the orbit bushing 320 in the linear operation mode. FIG. 4B is a schematic illustration of the relative arrangement of the guide bracket 330 and the orbit bushing 320 in the orbital operation mode. In the schematic illustration of transition between these two modes of operation, the guide bracket 330 remains fixed and a position and/or orientation of the orbit bushing 320 (and the reciprocating shaft 310 slidably received therein) relative to the guide bracket 330 is changed as the coupling pin 321 is moved in the direction of the arrow A in response to manipulation of the selection device 280. An orientation of the orbit bushing 320 is changed, for example, the orbit bushing 320 rotates about the coupling pin 321. That is, manipulation of the selection knob 282 causes corresponding movement of the arm 284. Coupling of the end portion of the arm 284 to the coupling pin 321 causes the coupling pin 321 (and the orbit bushing 320 and reciprocating shaft 310 coupled therein) to move upward (in the orientation illustrated in FIGS. 4A and 4B) in response to manipulation of the selection device 280, to transition from the linear mode to the orbital mode of operation. This movement of the coupling pin 321 and the orbit bushing 320 coupled thereto causes the reciprocating shaft 310 to rotate about the first end portion 310A, and a corresponding shift in orientation of the reciprocating shaft 310 and the orbit bushing 320 in which it is slidably received. As the reciprocating shaft 310 reciprocates in the orbital mode, the orbit bushing 320 rotates about the coupling pin 321 to accommodate the change in orientation of the reciprocating shaft 310 relative to the guide bracket 330.

During operation in the linear mode, t the bushing 320 is in a first position shown in FIG. 4A, in which the orbit bushing 320 is substantially aligned with the guide bracket 330. In this position, the orbit bushing 320 is substantially linearly aligned with the guide slots 332 of the guide bracket 330. This arrangement provides for a substantially linear movement of the reciprocating shaft 310 (and an accessory tool such as a blade coupled thereto), along the path shown by the arrow C1.

During operation in the orbital mode, the coupling pin 321 has shifted upward (in the example orientation shown in FIGS. 4A and 4B), to a second position from the first position (shown in shadow in FIG. 4B). In the second position shown in FIG. 4B, the orbit busing 320 has moved upward with the coupling pin 321, and has also rotated about the coupling pin 321. The first end portion 310A of the reciprocating shaft 310 remains pivotably engaged in the guide slots 332 (via the first and second rollers 312A, 312B), allowing the orientation of the reciprocating shaft 310 to change as the coupling point 321/orbit bushing 320 move upward. In the arrangement shown in FIG. 4B, the reciprocating shaft 310 slidably received in the bushing 320 (and an accessory tool such as a blade coupled thereto) follows a path as shown by the arrow C2 on an out stroke, and follows a path as shown by the arrows C3 and C4 on a return stroke. The slightly downward inclination of the arrow C3 and slightly upward inclination of the arrow C4 is enabled by the rotation of the orbit bushing 320 about the coupling pin 321, with the first end portion of the reciprocating shaft 310 moving in the guide slot 332 and the reciprocating shaft 310 being slidably received in the orbit bushing 320 as it moves through the stroke. Thus, the slightly downward inclination of the arrow C3 and the slightly upward inclination of the arrow C4 schematically illustrates the orbital reciprocating motion of the reciprocating shaft 310 (and an accessory tool such as a blade coupled thereto) generated due to the position and orientation of the orbit bushing 320 relative to the guide bracket 330 shown in FIG. 4B, the interaction between the rollers 312A, 312B at the first end portion of the reciprocating shaft 310 and the respective guide slots 332 formed in the guide bracket 330, and the rotation of the orbit bushing 320 about the coupling pin 321, when arranged in this manner. FIG. 4B schematically illustrates one example reciprocating orbital path that may be achieved by arrangement of the orbit bushing 320 relative to the guide bracket 330 in this manner. Other reciprocating orbital paths may be achieved by altering the position and/or orientation of the orbit bushing 320 relative to the fixed guide bracket 330.

Figure 5:
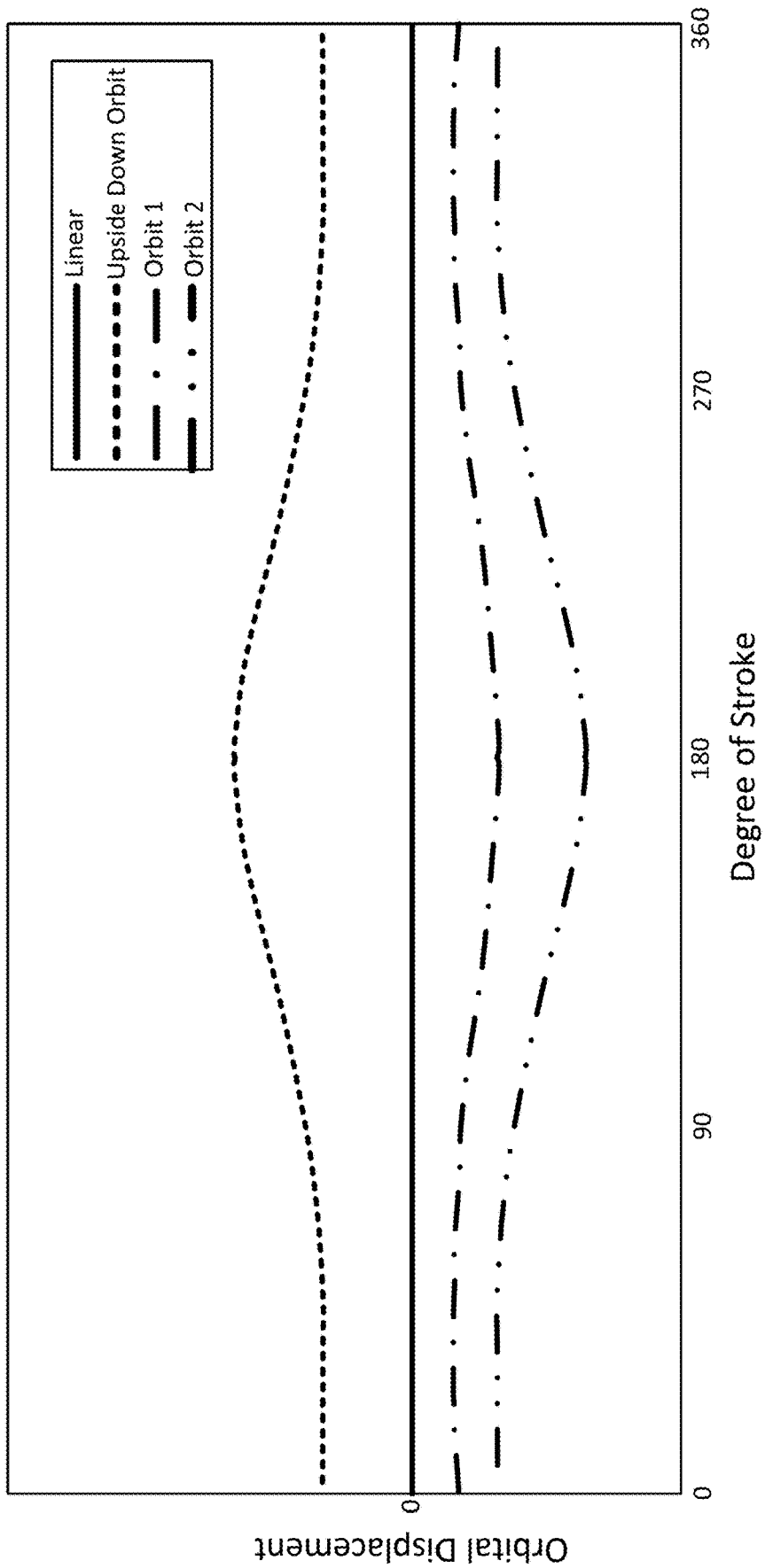
FIG. 5 is a graph illustrating orbit patterns for different degrees of orbital reciprocating motion of the example reciprocating power tool.

As noted above, a change in the position and/or orientation of the orbit bushing 320 in the direction of the arrow A and/or the arrow B (see FIGS. 3D, 3E and 4A) may change the degree of orbital motion incorporated into the reciprocal motion of the reciprocating shaft 310 (and an accessory tool such as a blade coupled thereto). The graph shown in FIG. 5 illustrates full reciprocating strokes for varying amounts of orbit in the reciprocating motion, as a function of displacement from the linear mode of operation, as the output gear 222 rotates through 360 degrees to complete a full stroke of the reciprocating shaft 310.

FIGS. 6A-6E are side views of the example reciprocating mechanism 300, illustrating operation of the example reciprocating mechanism 300 in the linear mode of operation. In FIGS. 6A-6E, the linear mode of operation has been selected in response to manipulation of the selection mechanism 280, and corresponding movement of the orbit bushing 320 as described above.

Figure 6A:
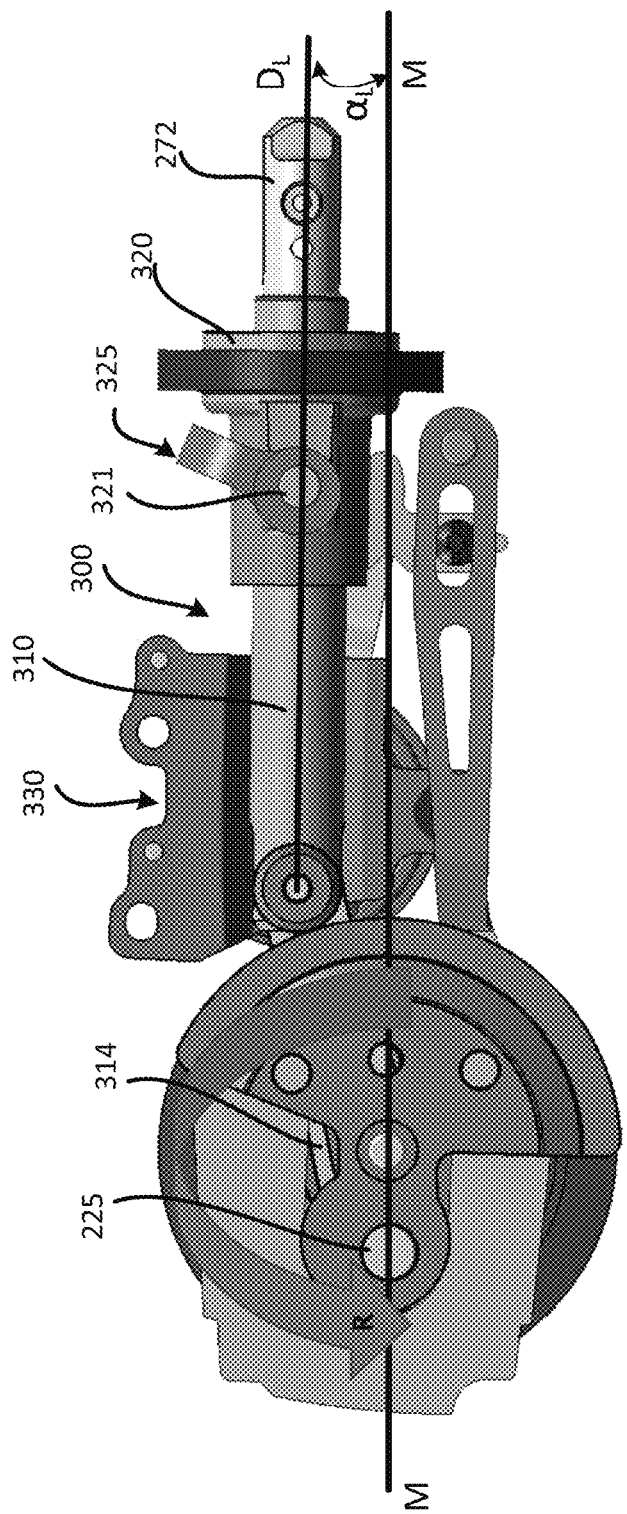
Figure 6D:
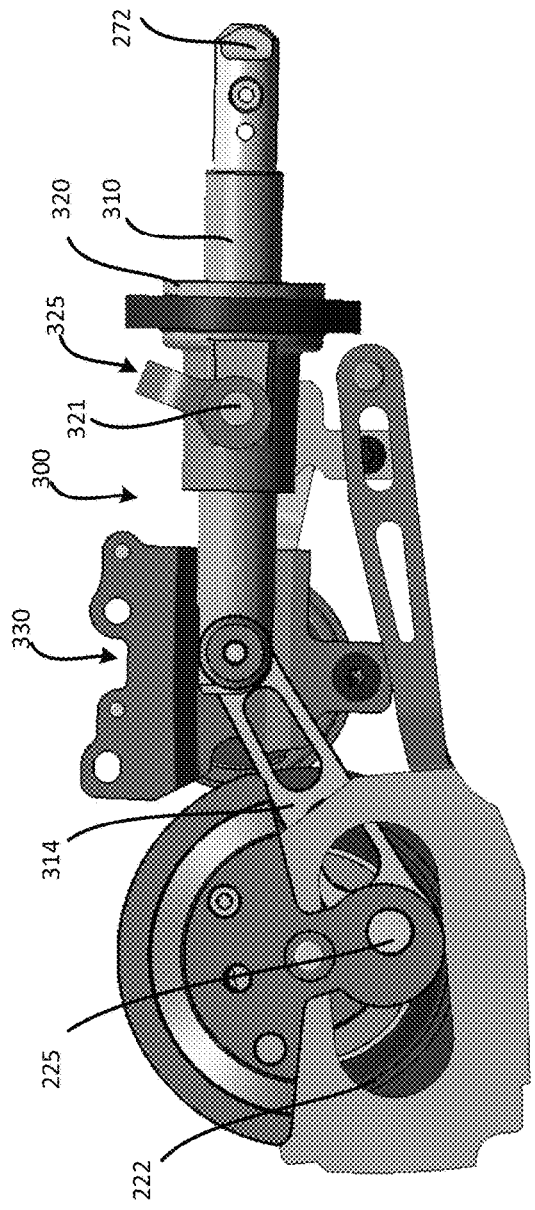
Figure 6E:
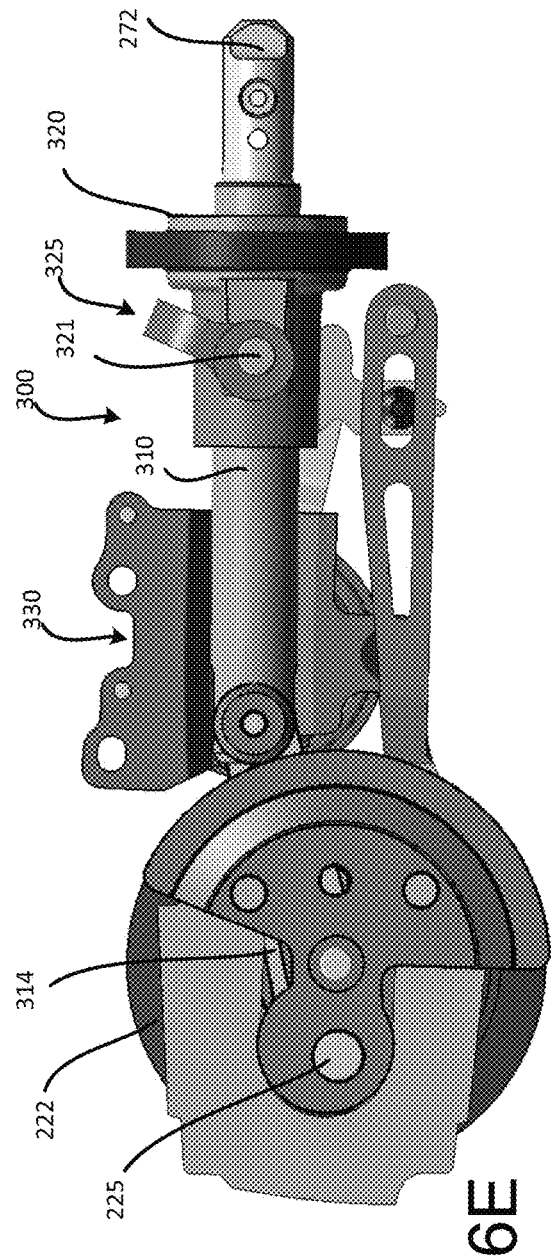

FIG. 6A illustrates the example reciprocating mechanism 300, set for the linear mode of operation, at the start of the stroke of the reciprocating mechanism 300. When set for the linear mode of operation, a centerline of the guide slots 332 is substantially aligned with a centerline of the orbit bushing 320 along the line $D_L$, and at an angle $α_L$ with respect to a motor axis M, shown in FIG. 6A. In FIG. 6A, the reciprocating shaft 310 is in a substantially fully inserted, or retracted, position, corresponding to substantially zero degrees of rotation position of the output gear 222. Rotation of the output gear 222, for example in the direction of the arrow R, causes the reciprocating shaft 310 to move in a direction away from the motor 210, to the position shown in FIG. 6B corresponding to approximately 90 degrees of rotation of the output gear 222 from the initial position shown in FIG. 6A, and on to the position shown in FIG. 6C corresponding to approximately 180 degrees of rotation of the output gear 222 from the initial position shown in FIG. 6A. The position shown in FIG. 6C represents the substantially fully extended position of the reciprocating shaft 310, corresponding to approximately 180 degrees of rotation of the output gear 222. In the position shown in FIG. 6C, the reciprocating shaft 310 has completed the out stroke, and initiates the return stroke as the output gear 222 continues to rotate. The position shown in FIG. 6D corresponds to approximately 270 degrees of rotation of the output gear 222, in which the reciprocating shaft 310 has moved into the return stroke. The position shown in FIG. 6E corresponds to approximately 360 degrees of rotation of the output gear 222, in which the reciprocating shaft 310 has completed the return stroke, and thus has completed a full stroke, from the zero degree position shown in FIG. 6A to the 360 degree position shown in FIG. 6E.

Figure 7A:
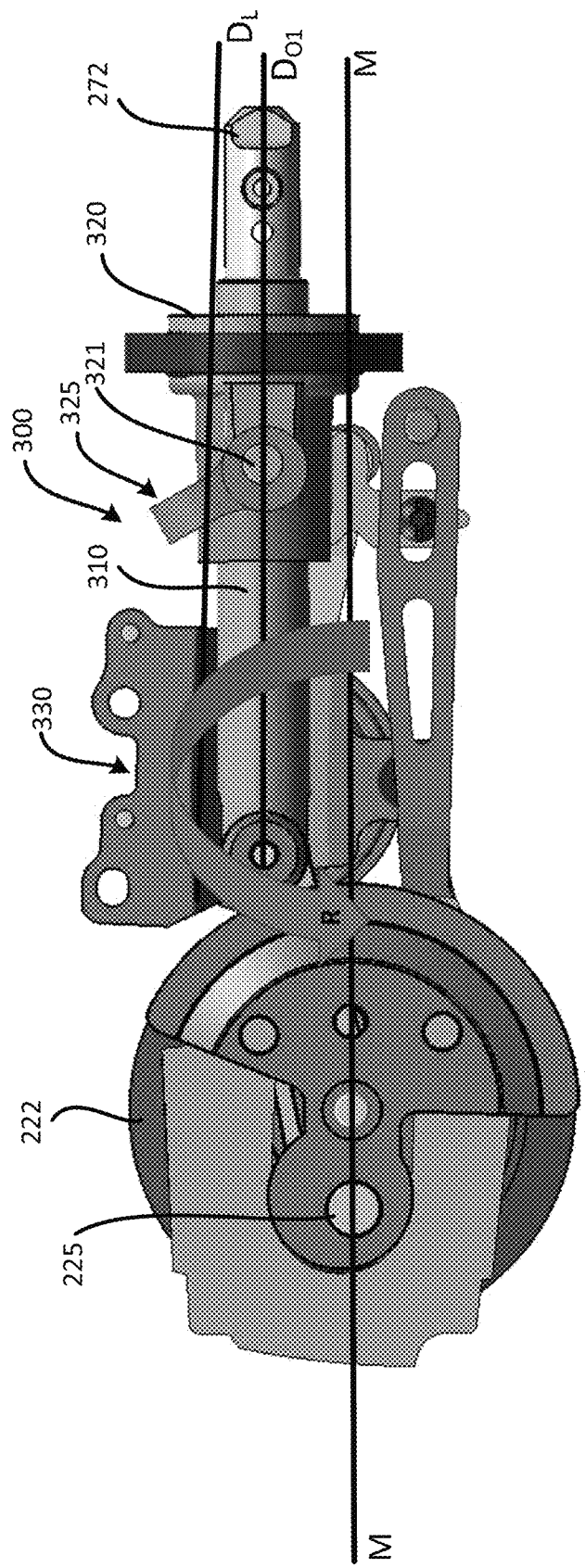

FIGS. 7A-7E are side views of the example reciprocating mechanism 300, illustrating operation of the example reciprocating mechanism 300 in an example orbital mode of operation. When set for the example orbital mode of operation, a centerline Doi of the orbit bushing 320 is now offset from the centerline $D_L$ of the guide slots 332, shown in FIG. 7A. In FIGS. 7A-7E, the example orbital mode of operation has been selected in response to manipulation of the selection mechanism 280, and corresponding movement of the orbit bushing 320 as described above. In the example orbital mode, the orbit bushing 320 and reciprocating shaft 310 have been moved upward from the position shown in FIG. 6A with respect to the linear mode of operation (upward in the example orientation shown in FIGS. 6A and 7A). This change in position and/or orientation of the orbit bushing 320 and the reciprocating shaft 310 slidably received therein causes the reciprocating shaft 310 to travel slightly upward during the out stroke (FIGS. 7A-7C), and slightly downward during the return stroke (FIGS. 7D-7E), following a first orbital path as the reciprocating shaft 310 reciprocates. FIG. 7A illustrates the example reciprocating mechanism 300, set for the example orbital mode of operation, at the start of the stroke of the reciprocating mechanism 300.

In FIG. 7A, the reciprocating shaft 310 is in a substantially fully inserted, or retracted, position, corresponding to substantially zero degrees of rotation position of the output gear 222. Rotation of the output gear 222, for example in the direction of the arrow R, causes the reciprocating shaft 310 to move in a direction away from the motor 210, to the position shown in FIG. 7B corresponding to approximately 90 degrees of rotation of the output gear 222 from the initial position shown in FIG. 7A, and on to the position shown in FIG. 7C corresponding to approximately 180 degrees of rotation of the output gear 222 from the initial position shown in FIG. 7A. The position shown in FIG. 7C represents the substantially fully extended position of the reciprocating shaft 310, corresponding to approximately 180 degrees of rotation of the output gear 222. Movement from the position shown in FIG. 7A to the position shown in FIG. 7C represents the out stroke of the reciprocating shaft 310. In the first orbital mode of operation, the position of the orbit bushing 320 causes the reciprocating shaft 310 to travel slightly upward during the out stroke.

In the position shown in FIG. 7C, the reciprocating shaft 310 has completed the out stroke, and further/continued rotation of the output gear 222 initiates the return stroke of the reciprocating shaft 310. The position shown in FIG. 7D corresponds to approximately 270 degrees of rotation of the output gear 222, in which the reciprocating shaft 310 has moved into the return stroke. The position shown in FIG. 7E corresponds to approximately 360 degrees of rotation of the output gear 222, in which the reciprocating shaft 310 has completed the return stroke, and thus has completed a full stroke, from the zero degree position shown in FIG. 7A to the 360 degree position shown in FIG. 7E. In the example orbital mode of operation shown in FIGS. 7A-7E, the position of the orbit bushing 320 causes the reciprocating shaft 310 to travel slightly downward during the return stroke.

FIGS. 7A-7E illustrate operation in one example orbital mode of operation. As described above, in some examples, the example tool 200 including the example reciprocating mechanism 300 may be capable of operating in other orbital modes. For example, in some implementations, the example tool 200 may operate in other orbital modes incorporating other degrees of orbit in the stroke, as described above with respect to FIG. 5.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A reciprocating power tool, comprising:
   a housing;
   a driving system including a motor and a transmission received in the housing;
   a selection mechanism moveably coupled to the housing and configured to provide for selection of an operation mode of a plurality of operation modes of the reciprocating power tool; and
   a reciprocating mechanism received in the housing, the reciprocating mechanism including:
      a guide bracket fixed in the housing;
      a bushing coupled to the selection mechanism and movably coupled in the housing; and
      a reciprocating shaft having a first end portion thereof coupled to the transmission and movably coupled to the guide bracket and an intermediate portion thereof movably coupled in the bushing, wherein the reciprocating shaft is configured to move in a reciprocating motion in response to a force transmitted thereto from the motor and the transmission.

2. The reciprocating power tool of claim 1, wherein a position of the bushing relative to the guide bracket is configured to change in response to a change in a position of the selection mechanism corresponding to a selected mode of operation of the reciprocating power tool.

3. The reciprocating power tool of claim 1, wherein the plurality of operation modes of the reciprocating power tool includes at least:
   a linear mode of operation in which the reciprocating motion of the reciprocating shaft follows a linear path; and
   at least one orbital mode of operation in which the reciprocating motion of the reciprocating shaft follows an orbital path.

4. The reciprocating power tool of claim 1, wherein the guide bracket includes:
   a first guide slot formed in a first side portion of the guide bracket and configured to guide movement of a first roller rotatably coupled to the first end portion of the reciprocating shaft; and
   a second guide slot formed in a second side portion of the guide bracket, wherein the second guide slot is configured to guide movement of a second roller rotatably coupled to the first end portion of the reciprocating shaft.

5. The reciprocating power tool of claim 4, wherein:
   in a first mode of operation of the plurality of operation modes, a central longitudinal axis of the first and second guide slots are aligned with a central longitudinal axis of the bushing; and
   in a second mode of operation of the plurality of operation modes, the central longitudinal axis of the bushing is offset from the central longitudinal axis of the first and second guide slots.

6. The reciprocating power tool of claim 5, wherein:
   the first mode of operation is a linear mode of operation in which the reciprocating motion of the reciprocating shaft follows a linear path; and
   the second mode of operation is an orbital mode of operation in which the reciprocating motion of the reciprocating shaft follows an orbital path.

7. The reciprocating power tool of claim 4, further comprising a yoke that provides at least a portion of the coupling between the reciprocating shaft and the transmission, the yoke having a first end portion thereof coupled to the first end portion of the reciprocating shaft, and a second end portion thereof coupled to an output gear of the transmission.

8. The reciprocating power tool of claim 7, wherein the second end portion of the yoke is coupled to an eccentric pin on the output gear such that the yoke moves in a linear reciprocal motion in response to rotation of the output gear.

9. The reciprocating power tool of claim 8, wherein the reciprocating shaft moves in a reciprocal motion in response to the reciprocal motion of the yoke, wherein,
   in a first mode of operation of the plurality of operation modes, in which the bushing is in a first position relative to the guide bracket, motion of the reciprocating shaft follows a linear reciprocating path in response to the reciprocal motion of the yoke; and
   in a second mode of operation plurality of operation modes, in which the bushing is in a second position relative to the guide bracket, motion of the reciprocating shaft follows an orbital reciprocating path in response to the reciprocal motion of the yoke.

10. The reciprocating power tool of claim 1, further comprising an orbit bracket that provides at least a portion of the coupling between the bushing and the selection mechanism, wherein the orbit bracket movably couples the selection mechanism to the bushing, the orbit bracket comprising:
- a first arm having a first end portion coupled to the bushing; and
- a second arm having a first end portion coupled to a second end portion of the first arm, and a second end portion coupled to a selection arm of the selection mechanism.

11. The reciprocating power tool of claim 10, wherein a position of the bushing relative to the guide bracket is configured to change in response to a manipulation of a selection knob coupled to the selection arm.

12. The reciprocating power tool of claim 1, further comprising an accessory tool holder at a second end portion of the reciprocating shaft.

13. A reciprocating power tool, comprising:
- a housing;
- a driving system including a motor and a transmission received in the housing;
- a selection mechanism moveably coupled to the housing and providing for selection of one of a plurality of modes of operation of the reciprocating power tool, the selection mechanism including:
  - a selection knob accessible from an exterior of the housing; and
  - a selection arm coupled to the selection knob at an interior of the housing; and
- a reciprocating mechanism received in the housing and coupled to the driving system and to the selection mechanism, the reciprocating mechanism including:
  - a reciprocating shaft;
  - a guide bracket fixed in the housing and configured to guide movement of a first end portion of the reciprocating shaft;
  - a bushing coupled to the selection mechanism, movably coupled in the housing, and coupled to an intermediate portion of the reciprocating shaft, wherein a position of the bushing relative to the guide bracket is changed in response to a manipulation of the selection mechanism; and
  - a yoke having a first end portion thereof coupled to the first end portion of the reciprocating mechanism and a second end portion thereof coupled to an eccentric pin on an output gear of the transmission, wherein the yoke receives a rotational force of the gear and applies a linear force to the reciprocating shaft, wherein the reciprocating shaft is configured to move in a reciprocating motion in response to rotation of the output gear and the corresponding linear force transmitted thereto by the yoke.

14. The reciprocating power tool of claim 13, wherein the plurality of modes of operation of the reciprocating power tool includes at least:
- a linear mode of operation in which the reciprocating motion of the reciprocating shaft follows a linear path; and
- at least one orbital mode of operation in which the reciprocating motion of the reciprocating shaft follows corresponding orbital path.

15. The reciprocating power tool of claim 14, wherein the at least one orbital mode of operation includes:
- a first orbital mode of operation in which the reciprocating motion of the reciprocating shaft follows a first orbital path;
- a second orbital mode of operation in which the reciprocating motion of the reciprocating shaft follows a second orbital path having a greater degree of ellipticity than that of the first orbital path; and
- a third orbital mode of operation in which the reciprocating motion of the reciprocating shaft follows a third orbital path that is different than the first orbital path and the second orbital path.

16. The reciprocating power tool of claim 15, wherein, in the first orbital mode of operation and the second orbital mode of operation, a position of the bushing results in an out stroke of the reciprocating shaft being shifted in a first direction from the linear mode of operation, and a return stroke of the reciprocating shaft being shifted in a second direction from the linear mode of operation, the second direction opposite the first direction; and
- the third orbital mode of operation is an upside-down orbital mode in which a position of the bushing results in the out stroke of the reciprocating shaft being shifted in the second direction from the linear mode of operation, and the return stroke of the reciprocating shaft being shifted in the first direction from the linear mode of operation.

17. The reciprocating power tool of claim 14, wherein:
- in the linear mode of operation of the reciprocating power tool, a central longitudinal axis of a first guide slot and a second guide slot of the guide bracket is aligned with a central longitudinal axis of the bushing; and
- in the at least one orbital mode of operation of the reciprocating power tool, the central longitudinal axis of the bushing is offset from the central longitudinal axis of the first and second guide slots.

18. The reciprocating power tool of claim 13, wherein the guide bracket includes:
- a first guide slot formed in a first side portion of the guide bracket and configured to guide movement of a first roller rotatably coupled to the first end portion of the reciprocating shaft; and
- a second guide slot formed in a second side portion of the guide bracket, wherein the second guide slot is configured to guide movement of a second roller rotatably coupled to the first end portion of the reciprocating shaft.

19. The reciprocating power tool of claim 13, further comprising an orbit bracket that provides at least a portion of the coupling between the bushing and the selection mechanism, wherein the orbit bracket movably couples the selection mechanism to the bushing, the orbit bracket comprising:
- a first portion coupled to the bushing by a pivot pin; and
- a second portion coupled to a selection arm of the selection mechanism,
- wherein the position of the bushing relative to the guide bracket is configured to change in response to movement of the selection knob coupled to the selection arm, and corresponding movement of the bushing.

* * * * *